(12) United States Patent
Luo et al.

(10) Patent No.: US 12,432,460 B2
(45) Date of Patent: Sep. 30, 2025

(54) CASCADE CAMERA TUNING

(71) Applicant: Motional AD LLC, Boston, MA (US)

(72) Inventors: Lin Luo, South San Francisco, CA (US); Arthur Safira, Boston, MA (US); Jeongil Ju, Torrance, CA (US); Ting Wang, Rancho Palos Verdes, CA (US)

(73) Assignee: Motional AD LLC, Boston, MA (US)

( * ) Notice: Subject to any disclaimer, the term of this patent is extended or adjusted under 35 U.S.C. 154(b) by 153 days.

(21) Appl. No.: 18/165,266

(22) Filed: Feb. 6, 2023

(65) Prior Publication Data

US 2024/0129605 A1 Apr. 18, 2024

Related U.S. Application Data

(60) Provisional application No. 63/379,625, filed on Oct. 14, 2022.

(51) Int. Cl.
*H04N 23/80* (2023.01)
*B60W 60/00* (2020.01)
(Continued)

(52) U.S. Cl.
CPC ......... *H04N 23/80* (2023.01); *B60W 60/0011* (2020.02); *H04N 1/00931* (2013.01);
(Continued)

(58) Field of Classification Search
CPC .... H04N 23/80; H04N 1/00931; H04N 23/61; H04N 23/665; H04N 23/90; H04N 23/12;
(Continued)

(56) References Cited

U.S. PATENT DOCUMENTS

2019/0043209 A1 2/2019 Nishimura et al.
2021/0329167 A1 10/2021 Lu et al.
(Continued)

FOREIGN PATENT DOCUMENTS

WO WO 2019/152499 A1 8/2019

OTHER PUBLICATIONS

Lee, Y. J. et al., "Application Requirement-Driven Automatic ISP Parameter Tuning for a Rear View Monitoring Camera", IEEE Access, Jun. 2021, vol. 9, pp. 82535-82549.
(Continued)

*Primary Examiner* — Christopher K Peterson
(74) *Attorney, Agent, or Firm* — Knobbe, Martens, Olson & Bear, LLP

(57) ABSTRACT

Provided are methods for cascade camera image signal processing (ISP) tuning, which can include receiving first image data at a first time associated with a first image sensor of a camera, generating at least one tuned first ISP block parameter for at least one first ISP block based on the first image data and first tuning criterion, receiving second image data at a second time, and generating at least one tuned second ISP block parameter for at least one second ISP block based on the second image data and second tuning criterion. Some methods described also include tuning parameters of at least one ISP block of a camera after receiving tuned parameters. Some methods describe also include generating an image using ISP blocks tuned using various tuning criteria. Systems and computer program products are also provided.

20 Claims, 20 Drawing Sheets

(51) Int. Cl.
*H04N 1/00* (2006.01)
*H04N 23/60* (2023.01)
*H04N 23/61* (2023.01)
*H04N 23/90* (2023.01)

(52) U.S. Cl.
CPC ........... *H04N 23/61* (2023.01); *H04N 23/665* (2023.01); *H04N 23/90* (2023.01); *B60W 2420/403* (2013.01); *B60W 2710/20* (2013.01)

(58) Field of Classification Search
CPC ....... B60W 60/0011; B60W 2420/403; B60W 2710/20
See application file for complete search history.

(56) References Cited

U.S. PATENT DOCUMENTS

2021/0390670 A1* 12/2021 Moon ................. G06T 1/20
2024/0064417 A1* 2/2024 Desai ................. H04N 23/90

OTHER PUBLICATIONS

International Search Report and Written Opinion received for PCT Application No. PCT/US2023/076653, mailed on Jan. 22, 2024.
U.S. Appl. No. 17/931,051, filed Sep. 9, 2022, Fu et al.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

\* cited by examiner

CASCADE CAMERA TUNING

BACKGROUND

Autonomous vehicles may use a variety of cameras to capture images of the vehicle's environment.

DETAILED DESCRIPTION

Figure 1:
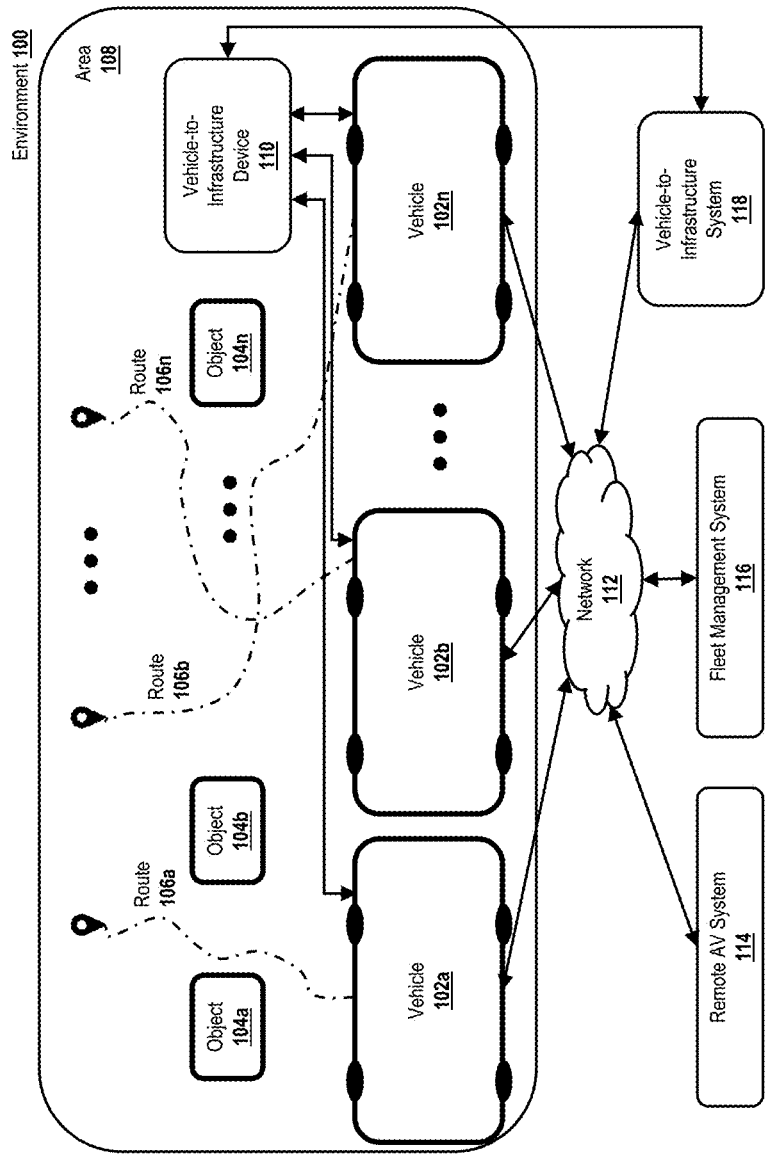
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement cascade tuning of image signal processing blocks of cameras used in an autonomous vehicle. For example, the systems, methods, and computer program products as descried herein may relate to receiving first image data associated with a first camera, tuning the basic ISP blocks of the first camera, receiving second image data associated with the first camera, and tuning application-specific ISP blocks of the first camera.

By virtue of the implementation of systems, methods, and computer program products described herein, techniques for cascade camera ISP tuning are described and the tuning process for cameras used for camera vision can be shortened significantly.

As described herein, a vehicle may utilize one or more cameras to capture images of the environment, which a perception system may use to recognize objects in the environment. The various cameras on the vehicle may each generate image data and process the image data based on the type of the camera and the processing configuration of the camera. The type of the camera may depend on the hardware and/or hardware configuration of the camera (e.g., image sensor type, image sensor manufacturer, image sensor specifications pixel size, pixel count, image sensor filters, lens type/size, field of view, etc.).

The cameras on the vehicle may be the same type or be a different type. For example, two or more cameras on the vehicle may have sensors from the same manufacturer with the same type of sensor, same pixel count, same filters, and/or the same field of view (e.g., same type), while other cameras on the vehicle may be from a different manufacturer and/or have a different type of sensor, different pixel count, different filters, and/or different field of view (e.g., different type). For example, a single autonomous vehicle may include eight moderate field of view (FOV) cameras (e.g., cameras with a viewing angle of approximately 25°-60°), four wide FOV cameras (e.g., cameras with a viewing angle of approximately 60°-100°), and one narrow field of view camera (e.g., cameras with a viewing angle of approximately 1°-25°). The eight moderate field of view cameras may share the same type of sensor from the same manufacturer and/or have the same field of view (e.g., be the same type). Similarly, the four wide FOV cameras may share the same type of sensor from the same manufacturer and/or have the same field of view (e.g., be the same type, but be a different type than the eight moderate field of view cameras).

The camera's processing configuration may depend on the type, order, and quantity of image signal processing (ISP) blocks (and corresponding ISP parameters) used to process image data generated by the camera's image sensor. The ISP blocks may vary depending on the type of camera and the application for which the camera is to be used. For example, depending on the type or application for the camera, the ISP blocks may include any one or any combination of HDR merging, bad pixel correction, black level correction, shading compensation, white balancing, demosaicing, color correction, tone mapping, de-noising, sharpening, etc. Moreover, the ISP blocks may each include one or more ISP parameters that determine how the respective ISP block processes the image data that it receives.

The cameras (of the same or different type) on a vehicle may be used for different applications or purposes, such as to capture the front, side, and/or rear view from the vehicle, and therefore have different processing configurations. Accordingly, the same or different types of cameras may be mounted at different locations on the exterior of the vehicle corresponding to the respective application or purpose. For example, one camera placed in line with the right-back passenger door may have a moderate FOV and be configured or tuned to capture images of objects in the rear right "blind spot," while another moderate FOV camera may be forward facing and configured or tuned to identify traffic signals (e.g., traffic lights, traffic signs, etc.).

In some cases, the same type of camera may be configured for the same application or purpose (e.g., have the same processing configuration) but placed at a different location. For example, the vehicle may include two moderate FOV cameras configured to capture images on either side of the vehicle (at the same angle relative to the vehicle). Given the variety of camera types, locations, and applications, numerous processing configurations of cameras may be used for a single autonomous vehicle.

As part of configuring a vehicle for use, the cameras may be "tuned" by selecting the ISP blocks that are to be used for the particular camera and adjusting the ISP parameters of the selected ISP blocks. The ISP parameters may vary based on the type of processing of the ISP block (e.g., color correction, sharpening, etc.) and may further vary based on the type of camera and intended application of the camera (e.g., what and where will it be capturing images). For example, different applications of the same type of camera may use different ISP parameters. Accordingly, different types of cameras used for the same application may also use different ISP parameters.

It may be difficult or time-intensive to tune each camera separately. To address this issue, a cascade camera ISP architecture may be used that performs a first or camera-type based ISP tuning for cameras of the same type and then performs a second or application-based (e.g., processing configuration-based) tuning for cameras of the same type that are to be used for the same application. As part of the camera-type based ISP tuning, the ISP parameters of ISP blocks that are common to applications of cameras of the same type may be tuned on a particular camera and copied over to other cameras in the perception system. Once copied, application-specific ISP blocks (and corresponding parameters) may be tuned individually according to the respective application or processing configuration. By performing different types of tuning at different stages, the time to tune the cameras may be reduced.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
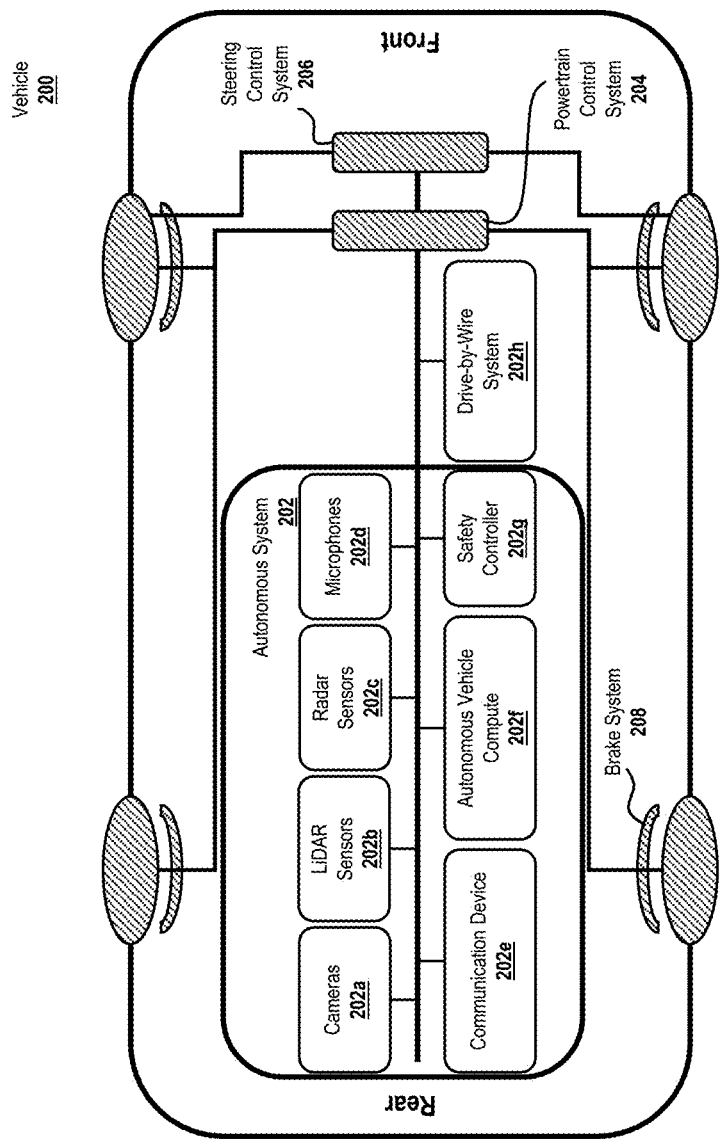
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
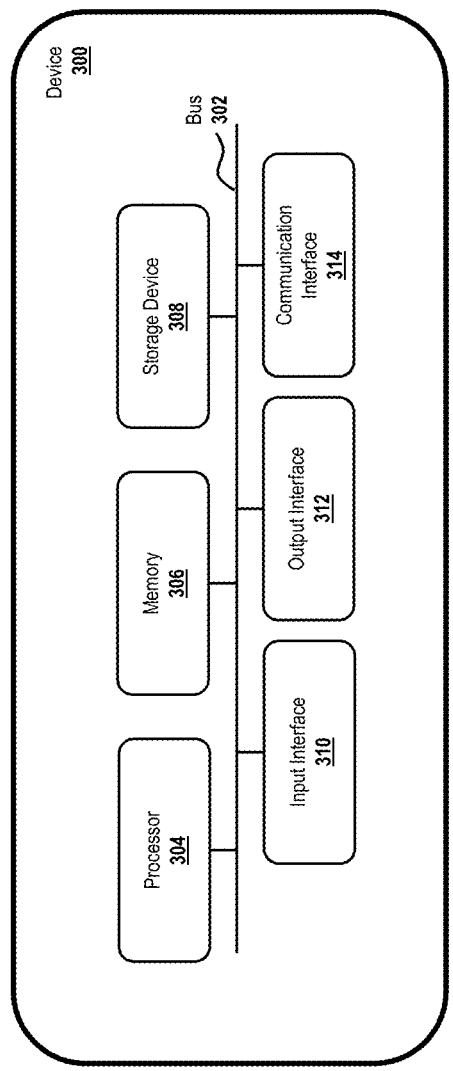
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
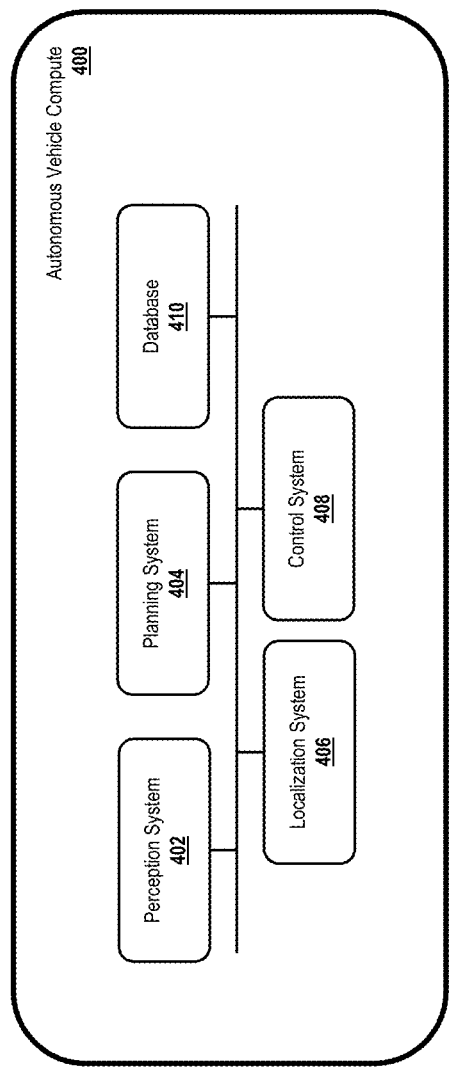
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
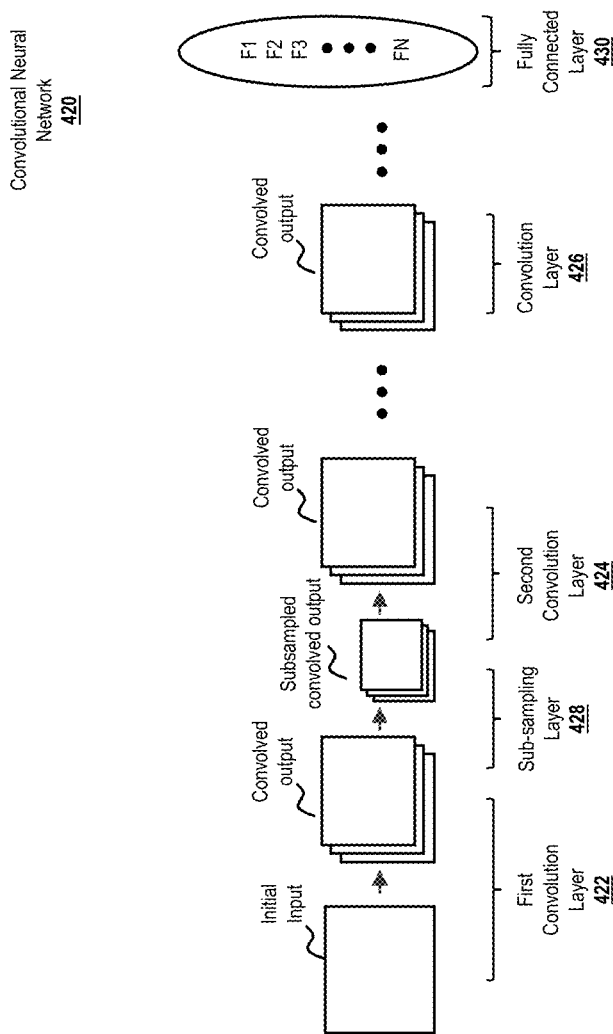
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
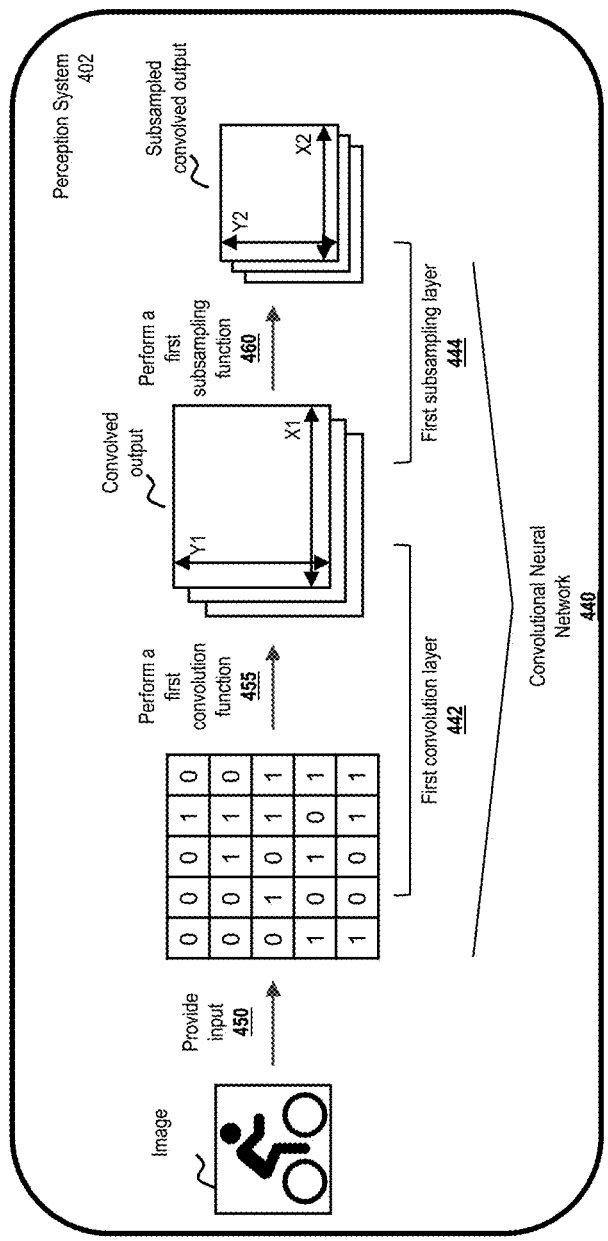
FIGS. 4C and 4D are a diagram illustrating example operation of a CNN.
Figure 4D:
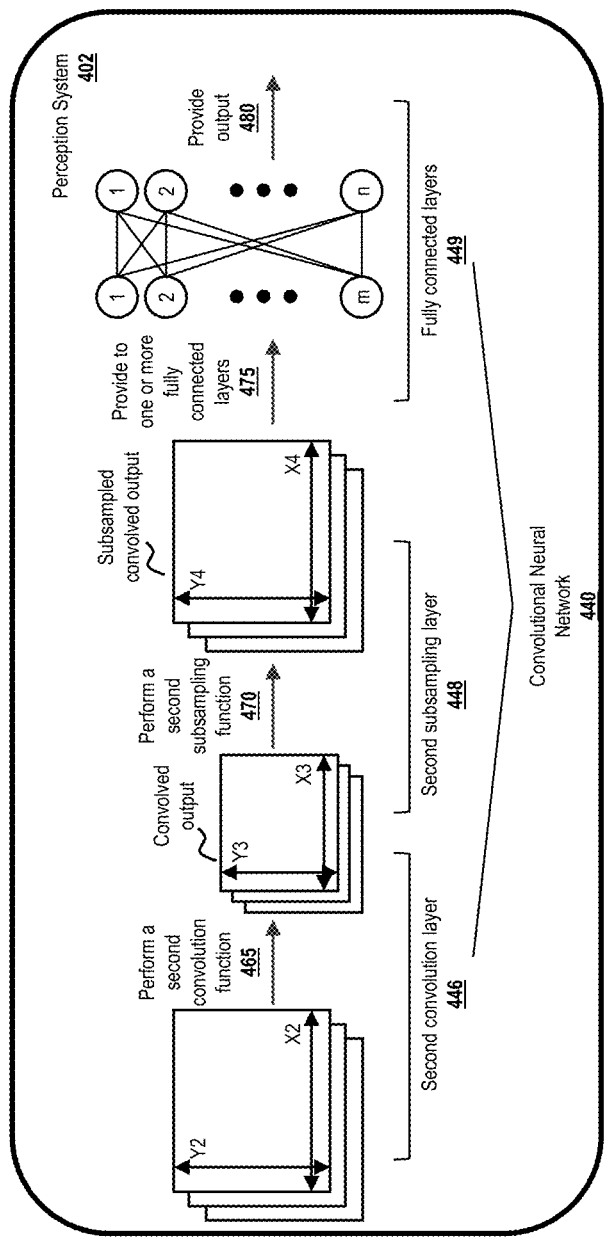

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Cascade ISP Camera Tuning

As described herein, the vehicle 200 may utilize one or more cameras 202a to capture images of the environment, which the perception system may use to recognize objects in the environment 100. The various cameras 202a on the vehicle 200 may each generate image data and process the image data based on the type of the camera and the processing configuration of the camera. The type of the camera may depend on the hardware and/or hardware configuration of the camera (e.g., image sensor type, image sensor manufacturer, pixel size, pixel count, image sensor filters, lens type/size, field of view, etc.).

The cameras 202a on the vehicle 200 may be the same type (e.g., use the same hardware, hardware configuration, or have the same field of view) or be a different type. In some cases, two or more cameras 202a on the vehicle 200 may have sensors from the same manufacturer with the same type of sensor, same pixel count, same filters, and/or the same field of view, while other cameras 202a on the vehicle 200 may be from a different manufacturer and/or have a different type of sensor, different pixel count, different filters, and/or different field of view. For example, a single autonomous vehicle may include eight moderate field of view (FOV) cameras (e.g., cameras with a viewing angle of approximately 25°-60°), four wide FOV cameras (e.g., cameras with a viewing angle of approximately 60°-100°), and one narrow field of view camera (e.g., cameras with a viewing angle of approximately 1°-25°). The eight moderate field of view cameras may share the same type of sensor from the same manufacturer and/or have the same field of view. Similarly, the four wide FOV cameras may share the same type of sensor from the same manufacturer and/or have the same field of view.

The camera's processing configuration may depend on the type, order, and quantity of image signal processing (ISP) blocks (and corresponding ISP parameters) used to process image data generated by the camera's image sensor. The ISP blocks may vary depending on the type of camera and the application for which the camera is to be used. For example, depending on the type or application for the camera, the ISP blocks may include any one or any combination of HDR merging, bad pixel correction, black level correction, shading compensation, white balancing, demosaicing, color correction, tone mapping, de-noising, sharpening, etc. Moreover, the ISP blocks may each include one or more ISP parameters that determine how the respective ISP block processes the image data that it receives.

The cameras 202a (of the same or different type) on a vehicle 200 may be used for different applications or purposes, such as to capture the front, side, and/or rear view from the vehicle, and therefore have different processing configurations. Accordingly, the same or different types of cameras 202a may be mounted at different locations on the exterior of the vehicle corresponding to the respective application or purpose. For example, one camera placed in line with the right-back passenger door may have a moderate FOV and be configured to capture images of objects in the rear right "blind spot," while another moderate FOV camera may be forward facing and configured to identify traffic signals (e.g., traffic lights, traffic signs, etc.).

In some cases, the same type of camera may be configured for the same application or purpose (e.g., have the same processing configuration) but placed at a different location. For example, the vehicle 200 may include two moderate FOV cameras configured to capture images on either side of the vehicle 200 (at the same angle relative to the vehicle 200). Given the variety of camera types, locations, and applications, numerous processing configurations of cameras may be used for a single AV.

As part of configuring a vehicle 200 for use, the cameras may be "tuned" by selecting the ISP blocks that are to be used for the particular camera and adjusting the ISP parameters of the selected ISP blocks. The ISP parameters may vary based on the type of processing of the ISP block (e.g., color correction, sharpening, etc.) and may further vary based on the type of camera and intended application of the camera (e.g., what and where will it be capturing images). For example, different applications of the same type of camera may use different ISP parameters. Accordingly, different types of cameras used for the same application may also use different ISP parameters.

It can be difficult or time-intensive to tune each camera separately. To address this issue, a cascade camera ISP architecture may be used that performs a first or camera-type based ISP tuning for cameras of the same type and then performs a second or application-based (e.g., processing configuration-based) tuning for cameras of the same type that are to be used for the same application. As part of the camera-type based ISP tuning, the ISP parameters of ISP blocks that are common to applications of cameras of the same type may be tuned on a particular camera and copied over to other cameras in the perception system. Once copied, application-specific ISP blocks (and corresponding parameters) may be tuned individually according to the respective application or processing configuration. By performing different types of tuning at different stages, the time to tune the cameras may be reduced.

As described herein, the vehicle 200 may utilize one or more of the cameras 202a to capture images of the environment, which the perception system may use to recognize objects in the environment. The various cameras 202a on the vehicle 200 may each generate image data and process the image data based on the type of the camera and the processing configuration of the camera. The type of the camera may depend on the hardware and/or hardware configuration of the camera (e.g., image sensor type, image sensor manufacturer, pixel size, pixel count, image sensor filters, lens type/size, field of view, etc.).

Figure 5A:
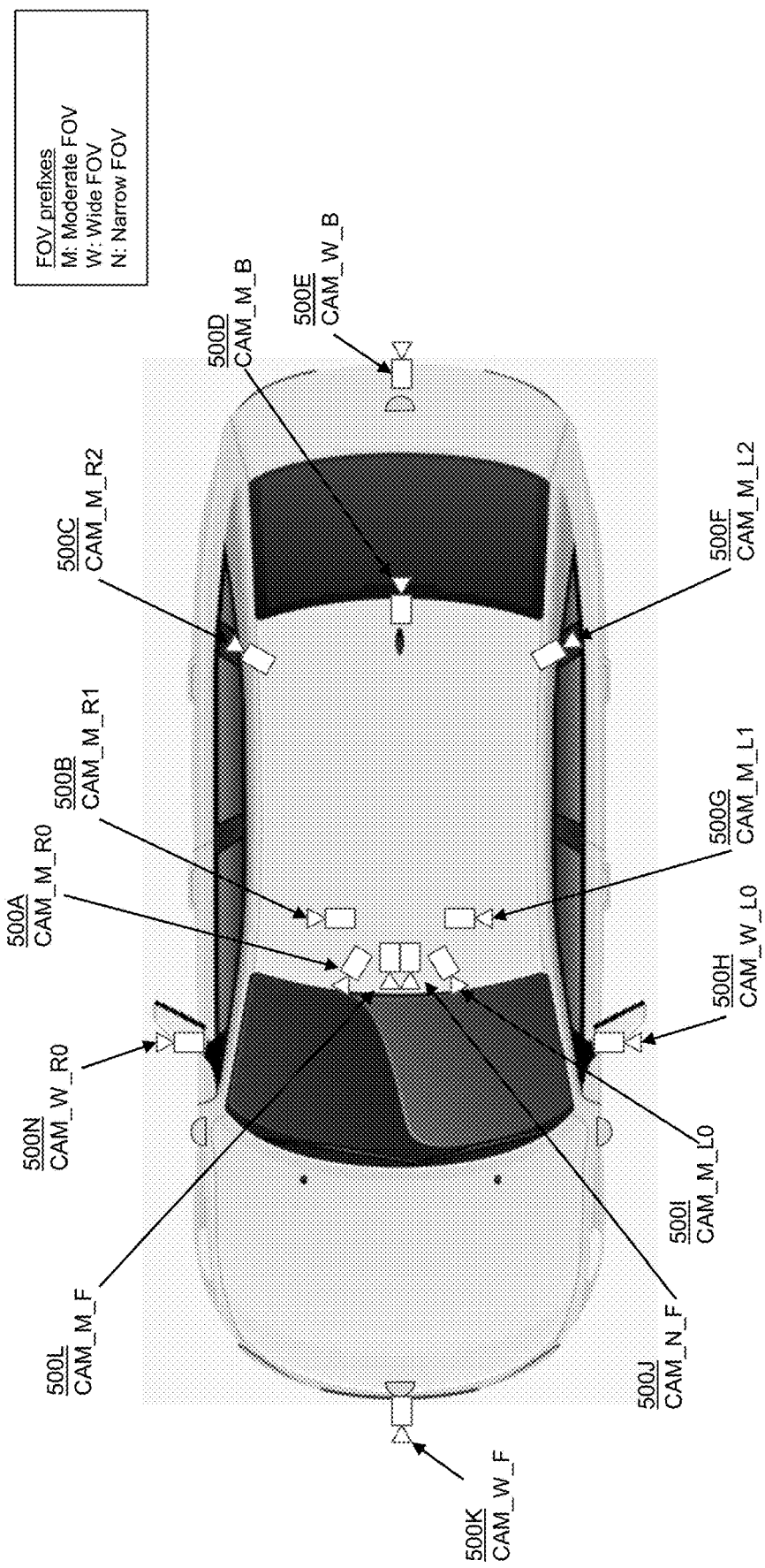
FIG. 5A is a block diagram illustrating an example of an autonomous vehicle with cameras.

FIG. 5A is a block diagram illustrating an example of an autonomous vehicle 502 with cameras 500A-500N (individually or collectively referred to as camera 500), which may be similar to the cameras 202a. In the illustrated example, the cameras 500 are placed at various positions and orientations on the vehicle 502, which may be similar to vehicle 200. Some of the cameras 500 may be the same type and have the same processing configuration, while other cameras may be a different type and/or have a different processing configuration. For example, two or more of the cameras 500 may have sensors from the same manufacturer with the same type of sensor, same pixel count, same filters (e.g., color filter in front of or associated with the pixels), and/or the same field of view (e.g., same type), while other cameras 500 may be from a different manufacturer and/or have a different type of sensor, different pixel count, different filters, and/or different field of view (e.g., different type). In the illustrated example, cameras 500A, 500B, 500C, 500D, 500F, 500G, 500I, and 500L are the same type of camera in that they at least have the same (moderate) field of view, the cameras 500E, 500H, 500K, and 500N are the same type of camera in that they at least have the same (wide) field of view, and the camera 500J may be a different type of camera than the cameras 500A-500I and 500K-500N in that camera 500J has a different (narrow) field of view. It will be understood that in certain cases, cameras of the same type may share multiple similarities in terms of field of view, manufacturer, sensor type, pixel size, pixel count, and/or pixel filters, etc.

In the illustrated example, the cameras 500A and 500I are located proximate the front of the roof of the vehicle and oriented to capture front-diagonal views from the vehicle. In some cases, the cameras 500A and 500I may be located at a (same) distance from the longitudinal axis of the vehicle and oriented at (approximately) opposite angles relative to the longitudinal axis of the vehicle. However, it will be understood that the cameras 500A and 500I may be placed at different locations or orientations relative to each other and relative to the longitudinal axis of the vehicle. Given the relationship in the position and orientation and similarity in terms of the view that is captured, the cameras 500N and 500H may have the same processing configuration or be configured for the same application or purpose (e.g., have the same ISP blocks, in the same order, with the same ISP block parameters).

In the illustrated example, the cameras 500B and 500G are oriented towards opposite sides of the vehicle to capture side views from the vehicle, including images of objects adjacent to the vehicle. Specifically, the cameras 500B and 500G are placed in line with the right-front passenger's door and driver's door, respectively. Given the relationship in the position and orientation of the cameras 500B and 500G, and similarity in terms of the view that is captured, the cameras 500B and 500G may have the same processing configuration or be configured for the same application or purpose.

In the illustrated example, the cameras 500C and 500F are located proximate the rear of the vehicle. Specifically, the cameras 500C and 500F are located in line with the right-rear passenger door and left-back passenger door, respectively. The position and orientation of the cameras 500C and 500F may enable them to capture the rear-diagonal views from the vehicle, such images of objects in the vehicle's "blind spots." Given the relationship in the position and orientation of the cameras 500C and 500F, and similarity in terms of the view that is captured, the cameras 500C and 500F may have the same processing configuration or be configured for the same application or purpose.

In the illustrated example, the camera 500L is located in line with the longitudinal axis of the vehicle and forward facing and may be used to capture the front view from the vehicle. Moreover, the camera 500L may be configured to capture images of vehicles in front of the vehicle 200, traffic lights, road signs, etc. Given the location, orientation, and expected objects to detect, the camera 500L may have a different processing configuration than the other cameras 500A-500K, 500M, and 500N.

In the illustrated example, the camera 500D is located in line with the longitudinal axis of the vehicle and rearward facing and may be used to capture the rear view from the vehicle. Given the location, orientation, and expected objects to detect, the camera 500D may have a different processing configuration than the other cameras 500A-500C and 500E-500N.

In the illustrated example, the cameras 500N and 500H are located proximate the front of the roof of the vehicle and oriented towards opposite sides of the vehicle to capture side views from the vehicle, including images of objects adjacent to the vehicle. Specifically, the cameras 500N and 500H are placed in line with the right and left side view mirrors, respectively. Given the relationship in the position and orientation of the cameras 500N and 500H, and similarity in terms of the view that is captured, the cameras 500N and 500H may have the same processing configuration or be configured for the same application or purpose.

In the illustrated example, the camera 500K is located in line with the longitudinal axis of the vehicle and frontward facing and may be used to capture the front view from the vehicle. Given the location, orientation, and expected objects to detect, the camera 500K may have a different processing configuration than the other cameras 500A-500J and 500L-500N.

In the illustrated example, the camera 500E is located in line with the longitudinal axis of the vehicle and rearward facing and may be used to capture a rear view from the vehicle. Given the location, orientation, and expected objects to detect, the camera 500E may have a different processing configuration than the other cameras 500A-500D and 500F-500N. In the illustrated example, the camera 500E is located proximate the rear of the vehicle.

In the illustrated example, the camera 500J is located in line with the longitudinal axis of the vehicle and forward facing and may be used to capture a front view from the vehicle. Moreover, the camera 500J may be configured to capture detailed images of vehicles in front of the vehicle 502, etc. Given the location, orientation, and expected objects to detect, the camera 500J may have a different processing configuration than the other cameras 500A-500I and 500K-500N.

It will be understood that the aforementioned example positions, orientations, and processing configurations of the cameras 500A-500N are non-limiting. Moreover, it will be understood that different positions, orientations, and/or processing configurations for the cameras 500A-500N may be used. As one non-limiting example, the cameras 500B and 500G may be placed closer to the center of the roof, proximate the rear of the roof, on the trunk of the vehicle, etc. Similarly, different orientations of any one or any combination of the cameras 500A-500N may be used. As another non-limiting example, the cameras 500B, 500C, 500F, 500G may have the same processing configuration despite having different positions and/or orientations on the vehicle 502.

Figure 5B:
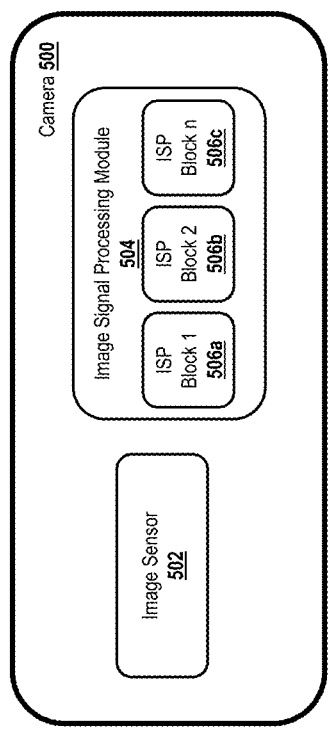
FIGS. 5B and 5C are block diagrams illustrating examples of a camera that may be utilized by a vehicle to capture images of the environment.

FIG. 5B is a block diagram illustrating an example of a camera 500 that may be utilized by a vehicle 200 to capture images of the environment. In the illustrated example, the camera 500 may be any one of the cameras 500A-500N described herein at least with reference to FIG. 5A. In some cases, the camera 500 may be used for any application or purpose and may be positioned on the exterior of the vehicle corresponding to the respective application or purpose. For example, the camera 500 may be positioned and oriented in line with the longitudinal axis of the vehicle 200 and forward facing, and may be used to capture a front view from the vehicle. Given the position, orientation, and expected objects to detect, the camera 500 may have a similar or different processing configuration than the other cameras 500 of the vehicle 200.

In the illustrated example, the camera 500 includes at least one image sensor 502 and an image signal processing module 504. The image sensor 502 may include a matrix of light-sensitive pixels configured to receive and/or absorb light and generate electrical signals based on the received/absorbed light. In some cases, the electrical signals may form and/or be combined to form image data or raw image data. The image sensor 502 may further be configured to communicate the (raw) image data that it generates to the image signal processing module 504.

The image signal processing module 504 may be configured to process the raw image data according to the camera 500's processing configuration. The processing configuration of the camera 500 may depend on the type, quantity, sequence, and/or the ISP parameter(s) of ISP blocks used by the image signal processing module 504 to process the raw image data generated by image sensor 502. Accordingly, cameras 500 with the same processing configuration may have the same sequence of ISP blocks with the same ISP parameters.

In the illustrated example, the image signal processing module 504 includes three ISP blocks, including the ISP Block 1 506a, the ISP Block 2 506b, and the ISP Block n 506c (individually or collectively referred to as ISP blocks 506), however, it will be understood that the image signal processing module 504 may include fewer or more ISP blocks 506 depending on the processing configuration of the camera 500.

The ISP blocks 506 of the image signal processing module 504 (and corresponding ISP parameters) of the camera 500 may vary in type based on the application or purpose for which the camera 500 is being used. For example, the ISP blocks 506 may include any one or any combination of an HDR merging ISP block, a bad pixel correction ISP block, a black level correction ISP block, a shading compensation ISP block, a white balancing ISP block, a demosaicing ISP block, a color correction ISP block, a tone mapping ISP block, a de-noising ISP block, a sharpening ISP block, etc. Moreover, the ISP blocks 506 may be ordered in any particular sequence according to the intended application or purpose for which the camera 500 is being used.

Moreover, the ISP blocks 506 may each include one or more ISP parameters that determine how a respective ISP block 506 processes the image data that it receives (from the image sensor 502 and/or from another ISP block). The ISP parameters may vary based on the type of processing of the image signal processing block (e.g., color correction, sharpening, etc.) and may further vary based on the type of camera and intended application or purpose. For example, a narrow front FOV camera (e.g., camera 500J) used for capturing details of objects (directly) in front of the vehicle 200 may include a sharpening ISP block 600 to enhance the image data. The sharpening ISP block 600 may utilize a sharpening radius parameter to control the area of pixels to be enhanced, a smaller radius enhancing smaller-scale detail. A wide FOV camera (e.g., camera 500K) may also include a sharpening image signal processing block but may include a greater sharpening radius parameter as small details of captured images may not be as relevant for its application.

Figure 5C:
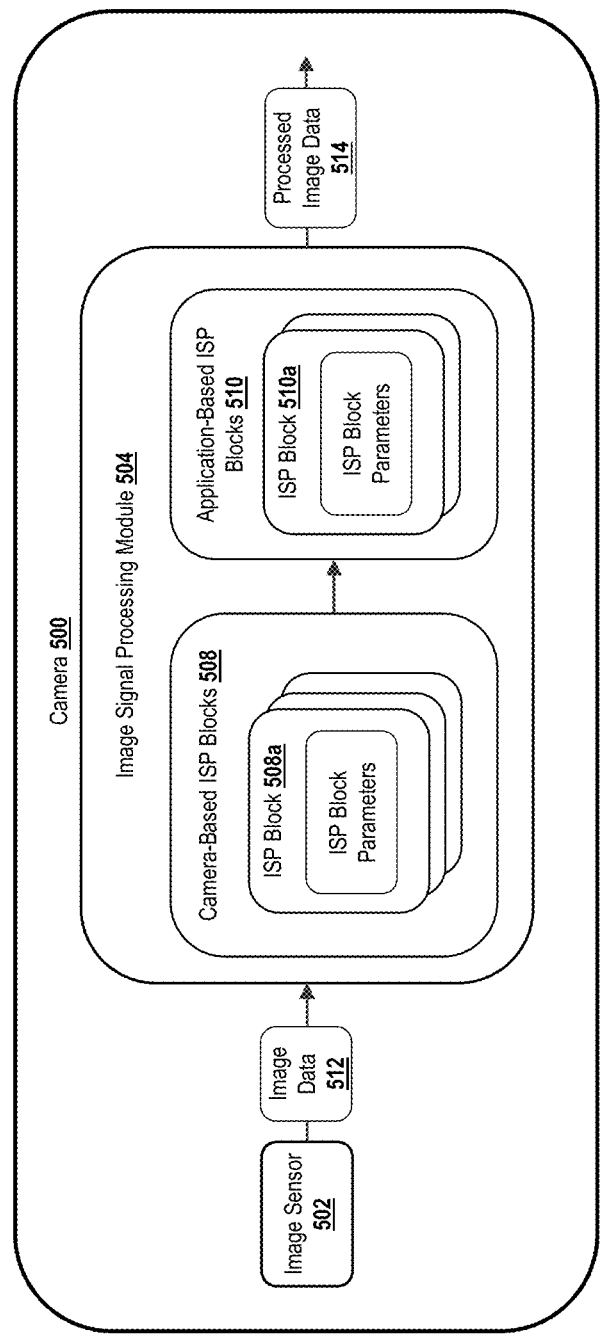

FIG. 5C is a block diagram illustrating an example of a camera 500 that may be any one of the cameras 500A-500N described herein at least with reference to FIG. 5A. In the illustrated example, the camera 500 includes at least one image sensor 502 and image signal processing module 504. In the illustrated example, the camera 500 may be configured to utilize image sensor 502 and image signal processing module 504 to process image data 512 and generate processed image data 514.

In the illustrated example, image sensor 502 may communicate image data 512 that it generates to the image signal processing module 504.

The image signal processing module 504 may be configured to process the image data 512 according to the camera's 500 processing configuration. The processing configuration of the camera 500 may depend on the type, quantity, sequence, and/or the ISP parameter(s) of ISP blocks used by the image signal processing module 504 to process the image data 512.

In the illustrated example, image signal processing module 504 includes camera-based ISP blocks 508 and application-based blocks 510. In the illustrated example, the image data 512 is processed by both camera-based ISP blocks 508 and application-based blocks 510, respectively. Once the image data 512 is processed by the camera-based ISP blocks 508 and an application-based blocks 510, the image signal processing module 504 may output the processed image data 514.

The camera-based ISP blocks 508 and application-based blocks 510 of the camera 500 may be the same or a different type of ISP blocks. For example, a camera 500 may include a camera-based ISP block 508 for image sharpening and an application-based block 510 for image sharpening. In some such cases, the ISP parameters of the different ISP blocks 506 may be different (e.g., the ISP parameters of the camera-based ISP block 508 for image sharpening and an application-based block 510 for image sharpening may be different).

The camera-based ISP blocks 508 may be an example of an ISP block 506 that is camera-specific and/or corresponds to the specific hardware of the camera 500. Camera-based ISP blocks 508 may include ISP blocks that are common to cameras of the same type. For example, wide FOV cameras (e.g., camera 500E, camera 500H, camera 500K, camera 500N) may include the same camera-based ISP blocks 508. In the illustrated example, camera-based ISP block 508a is shown, however, it will be understood that the camera 500 may include more camera-based ISP blocks 508 depending on the processing configuration of the camera 500. As noted above, the camera-based ISP blocks 508 may each include one or more ISP block parameters that determine how a respective camera-based ISP block 508 processes the image data (e.g., image data 512 and/or image data received from another camera-based ISP block 508) that it receives.

The application-based blocks 510 may include ISP blocks that are common to applications of cameras of the same type, such as cameras of the same type used for the same purpose and/or placed in similar or corresponding locations. For example, wide FOV cameras configured to capture images on either side of the vehicle 200 (e.g., camera 500N, camera 500H) may include the same camera-based ISP blocks 508 and application-based blocks 510. In the illustrated example, application-based block 510a is shown, however, it will be understood that the camera 500 may include more application-based blocks 510 depending on the processing configuration of the camera 500. As noted above, application-based blocks 510 may each include one or more ISP block parameters that determine how a respective application-based block 510 processes image data (e.g., imaged data 512 and/or image data received from a camera-based ISP block 508 and/or another application-based block 510) that it receives.

FIGS. 6A-6G are block diagrams illustrating examples of how one or more cameras for an autonomous vehicle may be tuned.

Figure 6A:
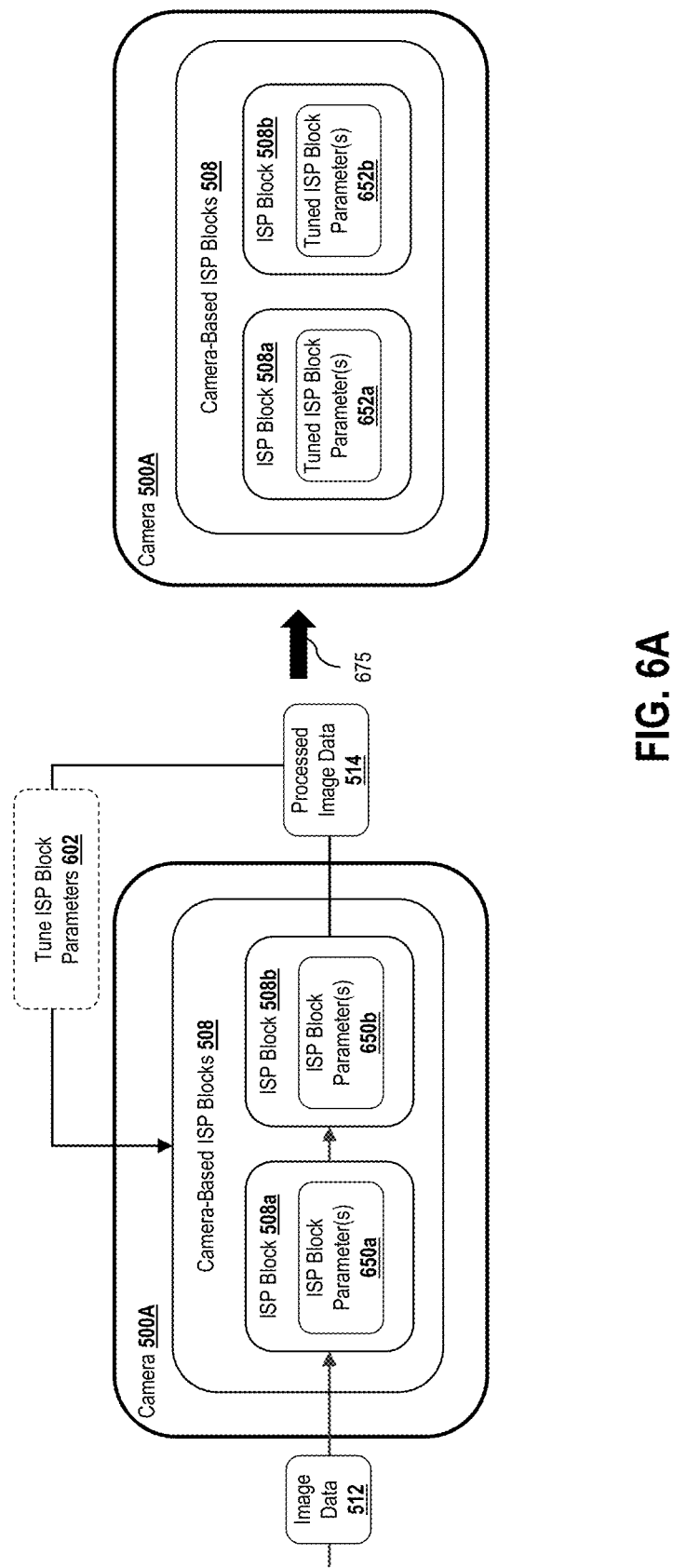
FIGS. 6A-6G are block diagrams illustrating examples of how one or more cameras for an autonomous vehicle may be tuned.

FIG. 6A is a block diagram illustrating an example of how camera-based ISP blocks 508 of the camera 500A may be tuned. Although references are made to camera 500A, it will be understood that any of the cameras 500 may be tuned in a similar manner. FIG. 6A illustrates an example of the camera 500A on the left side of the arrow 675 with camera-based blocks 508a, 508b (individually or collectively referred to as camera-based ISP blocks 508). Although not shown, it will be understood that the camera 500A may include one or more application-based ISP blocks, which may be deactivated during the tuning of the camera-based ISP blocks 508. The application-based ISP blocks are not shown in FIGS. 6A, 6B, for simplicity.

As described herein, the camera-based blocks 508 may be configured to process image data 512 and output processed image data 514. In the illustrated example, the camera-based ISP blocks 508 include camera-based ISP blocks 508a and 508b, however, it will be understood that the camera-based ISP blocks 508 may include fewer or more ISP blocks depending on the processing configuration of the camera 500A. Moreover, the ISP blocks 508 may be ordered in any particular sequence according to the processing configuration of the camera 500A.

In the illustrated example, the ISP block 508a includes one or more ISP block parameter(s) 650a that are to be tuned, and the ISP block 508b includes one or more ISP block parameter(s) 650b that are to be tuned. As described herein, the ISP block parameter(s) 650a and 650b may determine how a respective ISP block processes incoming image data (e.g., image data 512). For example, the ISP block parameter(s) 650a may determine how the ISP block 508a processes the image data 512 and the ISP block parameter(s) 650b may determine how the ISP block 508b processes the output of the ISP block 508a.

The output of the camera 500A or processed image data 514 may be used to tune the ISP block parameter(s) 650 of the camera-based ISP blocks 508. In the illustrated example, at step 602, the processed image data 514 is used to tune the ISP block parameter(s) 650a and 650b.

As used herein, tuning may refer to the modification of ISP block parameter(s) of an ISP block 506 (e.g., either camera-based ISP blocks 508 and/or application-based ISP blocks 510) of a camera 500. As part of the tuning process, individual ISP block parameter(s) of an ISP block 506 may be modified or adjusted one or more times until the output of the ISP block 506 satisfies a corresponding quality threshold. The threshold may depend on the type of processing performed by the ISP block 506. For example, if the ISP block 506 is for bad pixel correction, the ISP block parameter(s) of the bad pixel ISP block 506 may be modified until the effects of the bad pixels are eliminated or reduced to a particular threshold (e.g., zero or <1%). As another example, if the ISP block 506 is for white balancing, the corresponding ISP block parameter(s) may be tuned until a white balancing threshold is satisfied. Accordingly, tuning may occur in a "feedback loop," where the processed image data 514 reflects changes made to the ISP block parameter(s) (in real time). For example, the tuning of a color correcting ISP block 506 may occur by repeatedly assessing the processed image data 514 and adjusting the ISP block parameters of the color correcting ISP block 506 until the output of the color correcting ISP block 506 satisfies a color quality threshold.

The tuning process may be performed manually or automatically. For example, if the incoming image data is known, the processed image data of the camera 500 may be compared with expected processed image data. Based on the difference, the ISP block parameters of the ISP blocks 506 being tuned may be tuned until the difference between the processed image data and the expected processed image data is reduced or eliminated. In certain cases, a camera 500 may generate the processed image data in real time as image data is received. In some cases, the camera 500 may generate image data from thousands or millions of images as part of the tuning process.

In some cases, the ISP blocks 506 may be tuned individually. For example, the ISP block 508b may be deactivated such that the processed image data 514 reflects the output of the ISP block 508a. The output of the ISP block 508a may be used to adjust the ISP block parameter(s) 650a until a corresponding quality threshold is satisfied. Once the ISP block 508a is tuned, the ISP block 508b may be re-activated such that the processed image data 514 reflects the output of the ISP block 508b. The tuning process may then be repeated for ISP block 508b and/or any additional ISP blocks 508. In like manner, any number of the ISP block parameter(s) 650 may be tuned at step 602 for any number of the camera-based ISP blocks 508.

When tuning downstream or subsequent ISP blocks 506, preceding ISP blocks 506 may be left active such that they process or modify the image data 512 and/or they may be deactivated. For example, when tuning the ISP block 508b the ISP block 508a may be left active such that it processes or modifies the image data 512 and/or it may be deactivated such that it does not modify the image data 512.

In certain cases, the ISP blocks 506 may be tuned collectively. For example, the camera-based ISP blocks 508a and 508b may both be activated such that the image data 512 is processed by the camera-based ISP blocks 508a and 508b, and the processed image data 514 reflects the output of the ISP block 508b. In some such cases, the ISP block parameters 650 may be adjusted serially or concurrently.

FIG. 6A illustrates (on the right side of the arrow 675) an example of the camera 500A with camera-based ISP blocks 508 that include tuned ISP block parameter(s) 652a and 652b in place of ISP block parameter(s) 650a and 650b, respectively. In the illustrated example, the camera 500A includes the same camera-based ISP blocks 508, however, it will be understood that in some cases, during the tuning process one or more ISP blocks 508 may be removed or added (e.g., by physical addition/removal and/or activation/deactivation). Moreover, in some cases, during the tuning process, the order of the ISP blocks 508 may be modified.

Figure 6B:
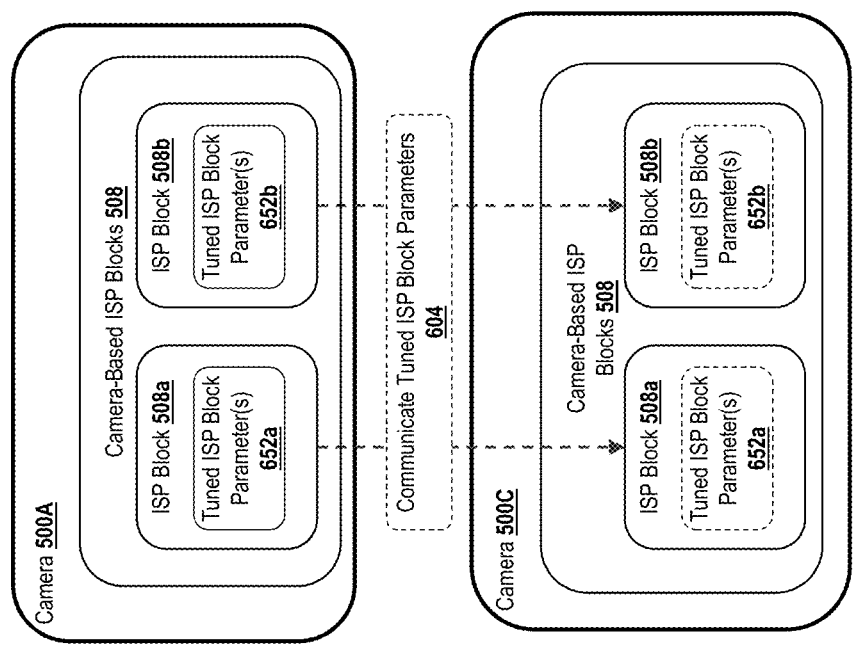

FIG. 6B is a block diagram illustrating an example of how tuned ISP block parameters 652 of camera-based blocks 508 may be communicated between cameras 500 of the same type regardless of whether the cameras will be used for different applications.

In the illustrated example, the camera 500A and the camera 500C are the same type of camera in that they at least have the same (moderate) field of view and/or may have similar/same hardware (e.g., from the same manufacturer, same version, specifications, and/or lot, etc.). However, the cameras 500A and 500C may be used for different applications in that the camera 500A may be used to capture a front-diagonal view from the vehicle 200 while the camera 500C may be used to capture the rear-diagonal view from the vehicle 200. Similarly, the camera 500A may be used to identify traffic signals (e.g., traffic lights or signs), vehicles or pedestrians that cross the vehicle's trajectory, etc., while the camera 500C may be used to identify vehicles or other objects approaching the vehicle 200 from behind or the side, etc.

As described herein, each of the cameras 500A and 500C may include camera-based ISP blocks 508. The camera-based ISP blocks 508 may be camera type-specific and correspond to the specific hardware of the camera. In the illustrated example, the camera-based ISP blocks 508 of cameras 500A and 500C include camera-based ISP blocks 508a and 508b, however, it will be understood that the cameras 500A and 500C may include fewer or more camera-based ISP blocks 508 depending on the type of the camera and the desired processing configuration of the cameras 500A and 500C. Moreover, as described herein, ISP blocks may be ordered in any particular sequence to achieve a particular processing configuration of the camera.

In the illustrated example and as described herein at least with reference to FIG. 6A, the camera 500A includes tuned ISP block parameter(s) 652 of camera-based ISP blocks 508. The tuned ISP block parameter(s) 652 may be communicated to the camera 500C so that the camera 500C may be tuned in the same way as camera 500A (e.g., have the same processing configuration with respect to camera-based ISP blocks 508). For example, the tuned ISP block parameters 652 of the camera 500A may be flashed, installed, programmed, or otherwise copied to camera 500C. In some cases, flashing may refer to updating the firmware of a target device with specific configurations. For example, the firmware of the camera 500C may be updated to be the same as or reflect the tuned firmware from the camera 500A. In certain cases, the tuned ISP block parameters 652 may be copied between cameras of the same type. In the illustrated example, at step 604, the tuned ISP block parameters 652a and 652b of camera-based ISP blocks 508 of camera 500A are communicated to camera 500C by flashing firmware of the camera 500C.

By communicating the tuned ISP block parameters 652 from the camera 500A to the camera 500C, the camera 500C may be tuned/configured in a relatively short period of time (e.g., in the amount of time it takes to flash/copy the tuned ISP block parameters 652 to the camera 500C). By configuring the camera 500C in this way, this may save time by orders of magnitude. For example, while it may take several days or weeks to tune the ISP block parameters 652 of the camera 500A, the ISP block parameters 652 of the camera 500C may be "tuned" in a matter of hours or minutes or less. Moreover, by communicating the ISP block parameters 652 from the camera 500a to the camera 500C, both cameras may be configured or tuned with the same processing configuration for the camera-based ISP blocks 508.

Although FIG. 6B illustrates an example of copying tuned ISP block parameters 652 from the camera 500A to the camera 500C, it will be understood that the tuned ISP block parameter(s) 652 may be copied among any two cameras 500A-500N of the same type.

Figure 6C:
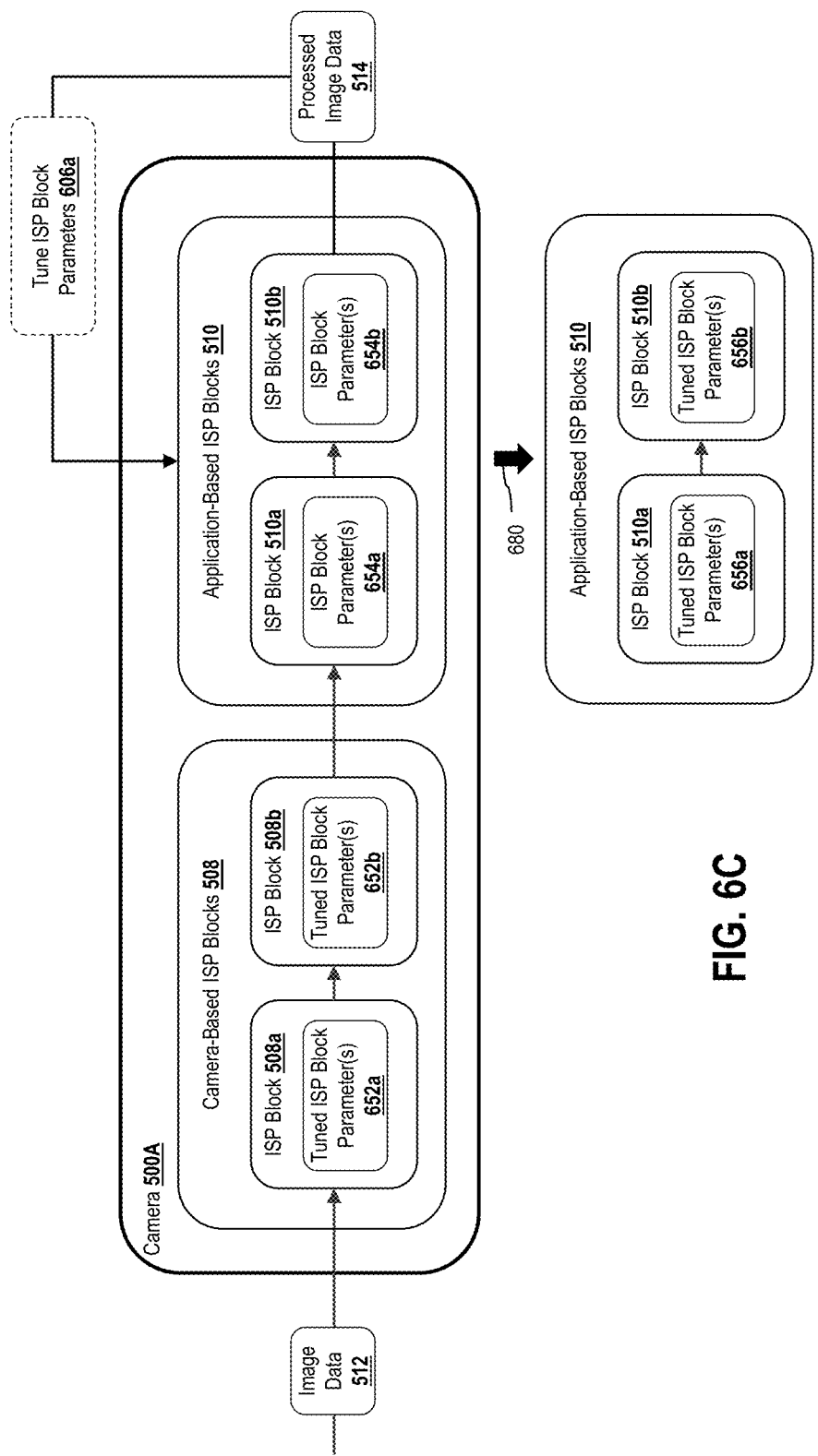

FIG. 6C is a block diagram illustrating an example of how application-based blocks in the camera 500A may be tuned.

In the illustrated example, the camera 500A includes camera-based blocks 508 with tuned ISP block parameter(s) 652 and application-based blocks 510a and 510b (individually or collectively referred to as application-based ISP blocks 510). As described herein, the application-based blocks 510 may be configured to process image data output by the camera-based ISP blocks 508 and output the processed image data 514. Although only two application-based blocks 510a and 510b are illustrated, it will be understood that the camera 500A may include fewer or more application-based ISP blocks 510 depending on the application or purpose of the camera 500A. Moreover, the application-based ISP blocks 510 may be ordered in any particular sequence according to the application, purpose, or location of the camera 500A.

In the illustrated example, the ISP block 510a includes one or more ISP block parameter(s) 654a that are to be tuned and the ISP block 510b includes one or more ISP block parameter(s) 654b that are to be tuned (individually or collectively referred to as ISP block parameter(s) 654). As described herein, ISP block parameter(s) 654 may determine how a respective ISP block processes incoming image data (e.g., image data output from the camera-based ISP blocks 508 and/or from a preceding application-based ISP block 510).

Similar to the tuning process of the camera-based ISP blocks 508 described herein with reference to FIG. 6A, the output of the camera 500A may be used to tune the ISP block parameters(s) 654 of the application-based blocks 510. In the illustrated example, at step 606a, the processed image data 514 is used to tune the ISP block parameter(s) 654a and 654b. Tuning may occur in a "feedback loop," where the processed image data 514 reflects changes made to the ISP block parameter(s) (e.g., in real time). As described herein, as part of the tuning process thousands or millions of images may be processed by the camera 500A (including any activated camera-based ISP blocks 508 and/or application-based ISP blocks 510) in real time.

In some cases, the application-based ISP blocks 510 may be tuned individually. For example, the application-based ISP block 510b may be deactivated such that the processed image data 514 reflects the output of the application-based ISP block 510a. The output of the application-based ISP block 510a may be used to adjust the ISP block parameter(s) 654a until a corresponding quality threshold is satisfied. Once the application-based ISP block 510a is tuned, the application-based ISP block 510b maybe re-activated such that the processed image data 514 reflects the output of the application-based ISP block 510b. The tuning process may then be repeated for the application-based ISP block 510b and/or any additional application-based ISP blocks 510. In like manner, any number of the ISP block parameter(s) 654 may be tuned at step 606a for any number of the application-based ISP blocks 510.

As described herein, when tuning downstream or subsequent application-based ISP blocks 510, preceding application-based ISP blocks 510 may be left active such that they process or modify the image data 512 and/or they may be deactivated. For example, when tuning the application-based ISP block 510b, the application-based ISP block 510a may be left active such that it processes or modifies the image data output from the camera-based ISP blocks 508 and/or it may be deactivated such that it does not modify the image data output from the camera-based ISP blocks. In like manner, some or all camera-based ISP blocks 508 may be left active or deactivated during the tuning of the application-based ISP blocks 510.

In certain cases, the application-based ISP blocks 510 may be tuned collectively. For example, the application-based ISP blocks 510a and 510b may both be activated such that the image data output from the camera-based ISP blocks is processed by the application-based ISP blocks 510a and 510b, and the processed image data 514 reflects the output of the ISP block 510b. In some such cases, the ISP block parameters 654 may be adjusted serially or concurrently.

FIG. 6C further illustrates (below the arrow 680) an example of (tuned) application-based blocks 510a and 510b that include tuned ISP block parameter(s) 656a and 656b, respectively, in place of the ISP block parameter(s) 654a and 654b. Although a consolidated illustration of the camera 500A with tuned ISP parameter(s) is not depicted in FIG. 6C, it will be understood that the camera 500A includes (tuned) camera-based ISP blocks 508 and (tuned) application-based blocks 510.

Figure 6D:
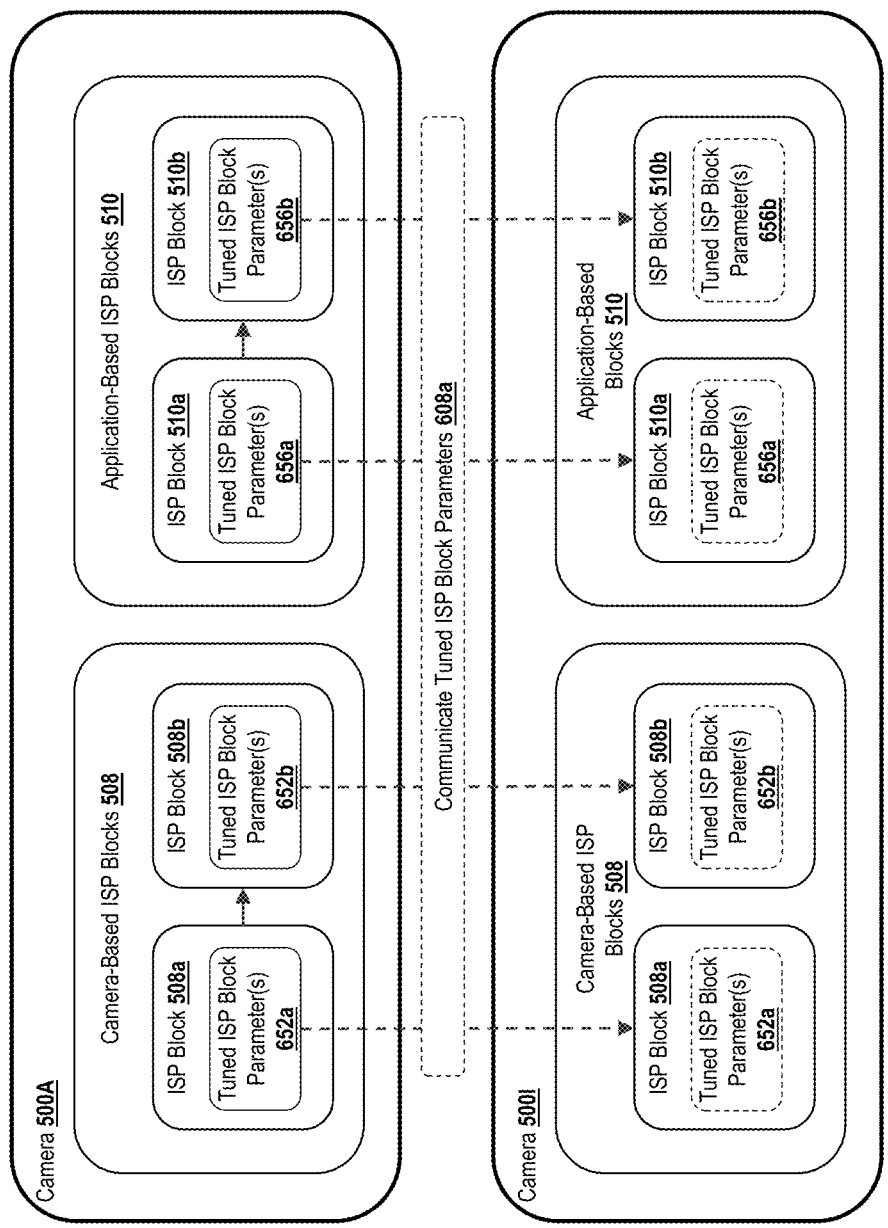

FIG. 6D is a block diagram illustrating an example of how tuned ISP block parameters of camera-based blocks 508 and application-based blocks 510 may be communicated between cameras 500 of the same type that will be used for the same application (e.g., are to have the same camera processing configuration).

In the illustrated example, the camera 500A includes tuned ISP block parameter(s) 652 of camera-based ISP blocks 508 and tuned ISP block parameter(s) 656 of application-based blocks 510. The tuned ISP block parameter(s) 652 and 656 of the camera 500A may be flashed, installed, programmed, or otherwise copied to camera 500I. In the illustrated example, at step 608a, the tuned ISP block parameters 652a and 652b of camera-based ISP blocks 508 and ISP block parameters 656a and 656b of application-based blocks 510 are communicated to camera 500I by flashing the firmware of camera 500I.

By communicating the tuned ISP block parameters 652 and 656 from the camera 500A to the camera 500I, the camera 500I may be tuned/configured in a relatively short period of time (e.g., in the amount of time it takes to flash/copy the tuned ISP block parameters 652 and 656 to the camera 500I). By configuring the camera 500I in this way, the camera 500I may be fully "tuned" without tuning of individual ISP blocks 506 and/or ISP block parameters. This may save time by orders of magnitude. For example, while it may take several days or weeks to tune the ISP blocks parameters 652 and 656 of the camera 500A, the ISP block parameters 652 and 656 of camera 500I may be "tuned" in a matter of hours or minutes or less.

Although FIG. 6D illustrates an example of copying tuned ISP block parameters 652 and 656 from the camera 500A to the camera 500I, it will be understood that the tuned ISP block parameter(s) 652 and 656 may be copied among any two cameras 500A-500N of the same type and used for the same application.

Figure 6E:
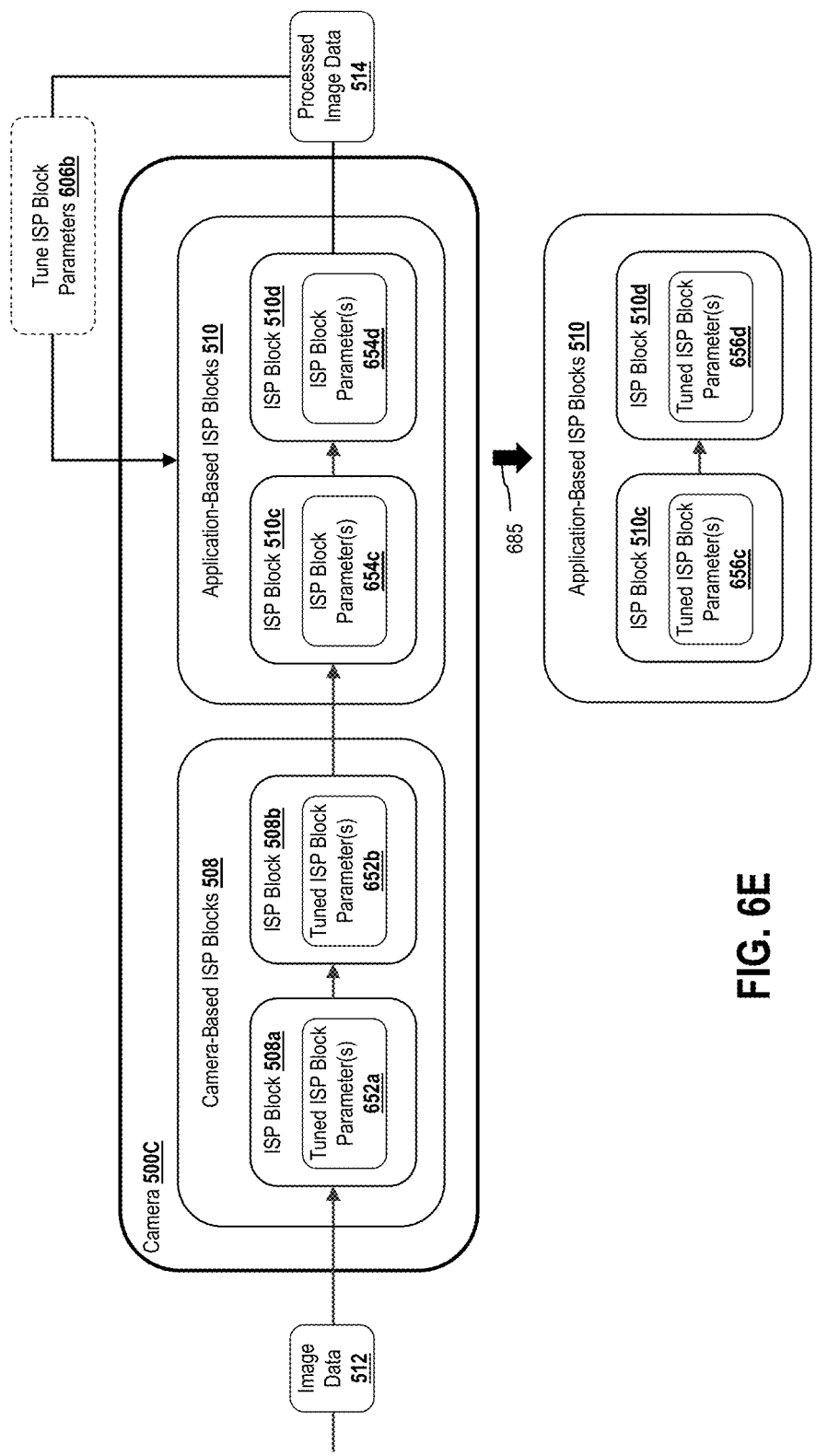

FIG. 6E is a block diagram illustrating an example of how application-based blocks 510 in the camera 500C may be tuned. It will be understood that the steps/processes described herein with reference to FIG. 6E may be performed concurrently with the steps or processes described herein with reference to FIGS. 6C and 6D. In this way, the application-based ISP blocks 510 of the same types of cameras 500 (with the same camera-based ISP blocks 508) may be tuned concurrently. By copying camera-based ISP blocks 508 between cameras of the same type and concurrently tuning application-based ISP blocks 510 for these cameras 500, the amount of time used to tune the cameras 500 may be reduced significantly.

In the illustrated example, the camera 500C includes camera-based ISP blocks 508 and corresponding tuned ISP block parameter(s) 652. As described herein at least with reference to FIG. 6B, the tuned ISP block parameters 652 of the camera-based ISP blocks 508 of the camera 500A may be communicated to the camera 500C by flashing the firmware of the camera 500C.

In the illustrated example, the camera 500C includes application-based blocks 510c and 510d (individually or collectively referred to as application-based blocks 510). As described herein, the application-based blocks 510 may be configured to process image data output by the camera-based ISP blocks 508 and output the processed image data 514. In the illustrated example, the application-based blocks 510 may include fewer or more ISP blocks depending on the application or purpose of the camera 500C. Moreover, the ISP blocks may be ordered in any particular sequence according to the application or purpose of the camera 500C. Given the different applications for the camera 500A and the camera 500C, it will be understood that some or all of the application-based ISP blocks 510 and/or ISP block parameters 654 (or tuned ISP block parameters 656) of the camera 500C are different from the application-based ISP blocks 510 and/or ISP block parameters 654 (or tuned ISP block parameters 656) of the camera 500A. In certain cases, the application-based ISP blocks 510 of the cameras 500A and 500C may be mutually exclusive (e.g., no overlap).

In some cases, the camera 500C may include more or different application-based ISP blocks 510 than the camera 500A. For example, the camera 500A may include application-based ISP blocks 510 for color correction and/or tone mapping, while the camera 500C may include application-based ISP blocks 510 for white balancing, demosaicing, color correction, and sharpening.

In certain cases, the cameras 500A and 500C may include some or all of the same application-based ISP blocks 510 but with different ISP block parameters 654 (or tuned ISP block parameters 656). For example, the ISP block parameters 654 (or tuned ISP block parameters 656) in an application-based ISP block 510 for color correction of the camera 500A may be differ from the ISP block parameters 654 (or tuned ISP block parameters 656) in an application-based ISP block 510 for color correction of the camera 500C.

In the illustrated example, the ISP block 510c includes one or more ISP block parameter(s) 654c that are to be tuned and the ISP block 510d includes one or more ISP block parameter(s) 654d that are to be tuned. As described herein, ISP block parameter(s) 654c and 654d may determine how a respective ISP block processes image data output from the application-based blocks 510.

Similar to the tuning process of the application-based blocks 510 of camera 500A in FIG. 6C, the output of the camera 500C may be used to tune the ISP block parameter(s) 654 of the application-based blocks 510 of camera 500C. Tuning may occur in a "feedback loop," where the processed image data 514 reflects changes made to the ISP block parameter(s) 654 (in real time). As described herein, as part of the tuning process thousands or millions of images may be processed by the camera 500C (including any activated camera-based ISP blocks 508 and/or application-based ISP blocks 510) in real time.

In some cases, the application-based ISP blocks 510 may be tuned individually. For example, the application-based ISP block 510d may be deactivated such that the processed image data 514 reflects the output of the application-based ISP block 510c. The output of the application-based ISP block 510c may be used to adjust the ISP block parameter(s) 654c until a corresponding quality threshold is satisfied. Once the application-based ISP block 510c is tuned, the application-based ISP block 510d maybe re-activated such that the processed image data 514 reflects the output of the application-based ISP block 510d. The tuning process may be repeated for application-based ISP block 510d and/or any additional application-based ISP blocks 510. In like manner, any number of the ISP block parameter(s) may be tuned at step 606b for any number of the application-based ISP blocks 510.

When tuning downstream or subsequent application-based ISP blocks 510, preceding application-based ISP blocks 510 may be left active such that they process or modify the image data 512 and/or they may be deactivated. For example, when tuning the application-based ISP block 510d, the application-based ISP block 510c may be left active such that it processes or modifies the image data output from the camera-based ISP blocks 508 and/or it may be deactivated such that it does not modify the image data output from the camera-based ISP blocks 508. In like manner, some or all camera-based ISP blocks 508 of the camera 500C may be left active or deactivated during the tuning of the application-based ISP blocks 510 of the camera 500C.

In certain cases, the ISP blocks 506 may be tuned collectively. For example, the application-based ISP blocks 510c and 510d may both be activated such that the image data output from the camera-based ISP blocks is processed by the application-based ISP blocks 510c and 510d, and the processed image data 514 reflects the output of the ISP block 510d. In some such cases, the ISP block parameters 654 may be adjusted serially or concurrently.

FIG. 6E further illustrates (below the arrow 685) an example of the (tuned) application-based blocks 510c and 510d that include (tuned) ISP block parameter(s) 656c and 656d, respectively, in place of ISP block parameter(s) 654c and 654c. Although a consolidated illustration of the camera 500C with tuned ISP parameter(s) 656 is not depicted in FIG. 6E, it will be understood that the camera 500C may include tuned camera-based ISP blocks 508 and tuned application-based blocks 510.

By configuring the camera 500C in this way, the camera 500C may be tuned/configured in a relatively short period of time (e.g., in the amount of time it takes to flash/copy the tuned ISP block parameters 652 to the camera 500C and the amount of time it takes to tune the application-based blocks 510 of the camera 500C). For example, although it may take several days or weeks to tune the ISP block parameters 656 of the camera 500C, the ISP block parameters 652 of the camera 500C may be "tuned" in a matter of hours or minutes or less.

Figure 6F:
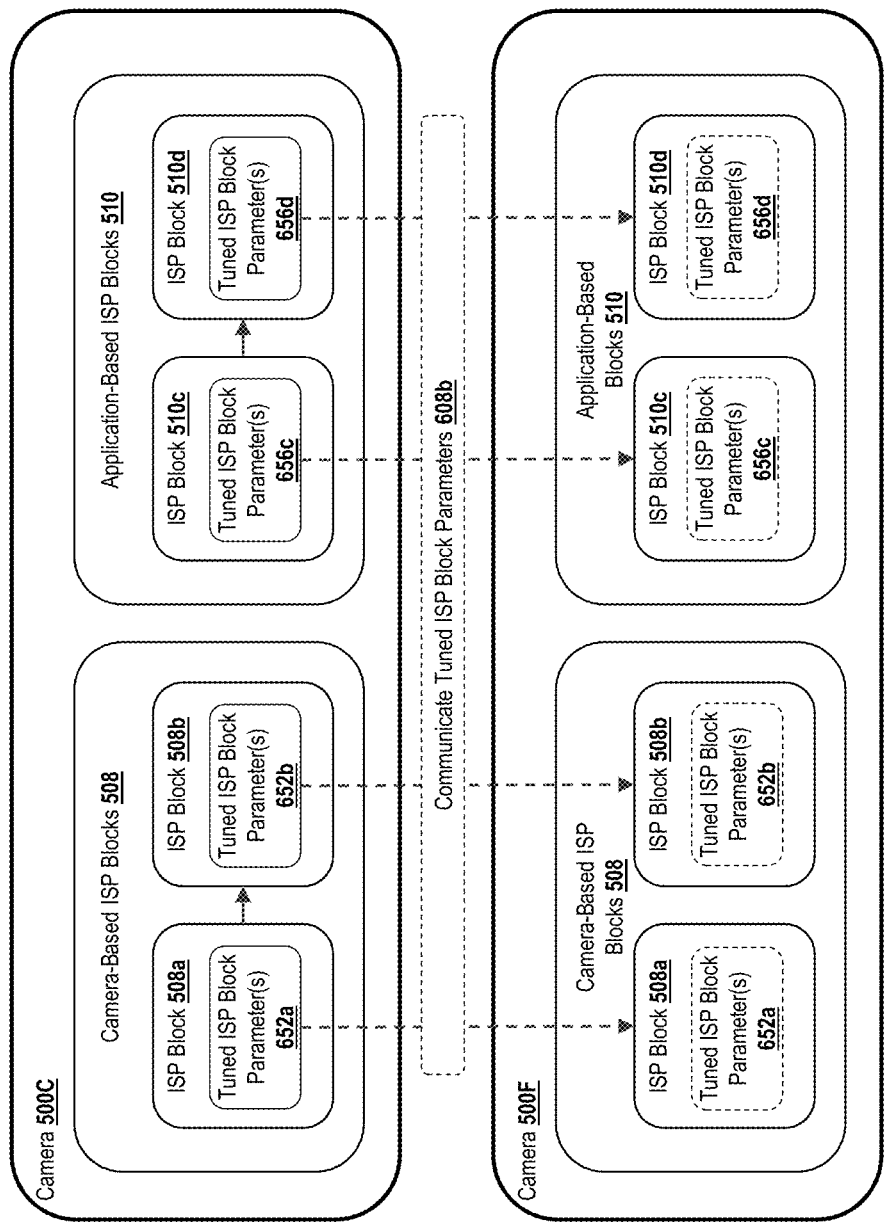

FIG. 6F is a block diagram illustrating an example of how cascaded ISP block parameter tuning may be communicated between cameras of the same type and that will be used for the same application. It will be understood that the steps/processes described herein with reference to FIG. 6F may be performed concurrently with the steps or processes described herein with reference to FIGS. 6C and 6D. In this way, the application-based ISP blocks 510 of the same types of cameras 500 (with the same camera-based ISP blocks 508) may be tuned concurrently. By copying camera-based ISP blocks 508 between cameras of the same type and concurrently tuning application-based ISP blocks 510 for these cameras 500, the amount of time used to tune the cameras 500 may be reduced significantly.

In the illustrated example, the cameras 500C and 500F are the same type of camera in that they at least have the same (moderate) field of view and/or may have similar/same hardware (e.g., from the same manufacturer, same version, specifications, and/or lot, etc.) or hardware configuration. Here, camera 500C and 500F are the same type of camera in that they at least have the same (moderate) field of view. Additionally, cameras 500C and 500F may have the same application in that they both may be used to capture rear-diagonal views from the vehicle 200. Similarly, the cameras 500C and 500F may both be used to identify vehicles and pedestrians in the rear-diagonal "blind spots" of the vehicle, etc. Accordingly, it may be desirable for the camera 500F to have the same processing configuration (e.g., same type, order, and quantity of ISP processing blocks 506 and same ISP processing block parameters) as camera 500C.

In the illustrated example, the camera 500C includes tuned camera-based ISP blocks 508 with tuned ISP block parameter(s) 652 (e.g., received from camera 500A) and tuned application-based blocks 510 with tuned ISP block parameter(s) 656. The tuned ISP block parameters 652 and 656 may be flashed, installed, or otherwise copied to the camera 500F. In the illustrated example, at step 608b, the tuned ISP block parameters 652a and 652b of camera-based ISP blocks 508 and ISP block parameters 656c and 656d of application-based blocks 510 are communicated to camera 500F by flashing the firmware of camera 500F.

By communicating the tuned ISP block parameters 652 and 656 from the camera 500C to the camera 500F, the camera 500F may be tuned/configured in a relatively short period of time (e.g., in the amount of time it takes to flash/copy the tuned ISP block parameters 652 and 656 to the camera 500F). By configuring the camera 500F in this way, the camera 500F may be fully "tuned" without any manual tuning of individual ISP block parameters. This may save time by orders of magnitude. For example, while it may take several days or weeks to tune the ISP blocks parameters 652 and 656 of the camera 500C, the ISP block parameters 652 and 656 of camera 500F may be "tuned" in a matter of hours or minutes or less.

Although FIG. 6F illustrates an example of copying tuned ISP block parameters 652 and 656 from the camera 500C to the camera 500F, it will be understood that the tuned ISP block parameter(s) 652 and 656 may be copied among any two cameras 500A-500N of the same type used for the same application (e.g., places in the same or related location of the vehicle).

Figure 6G:
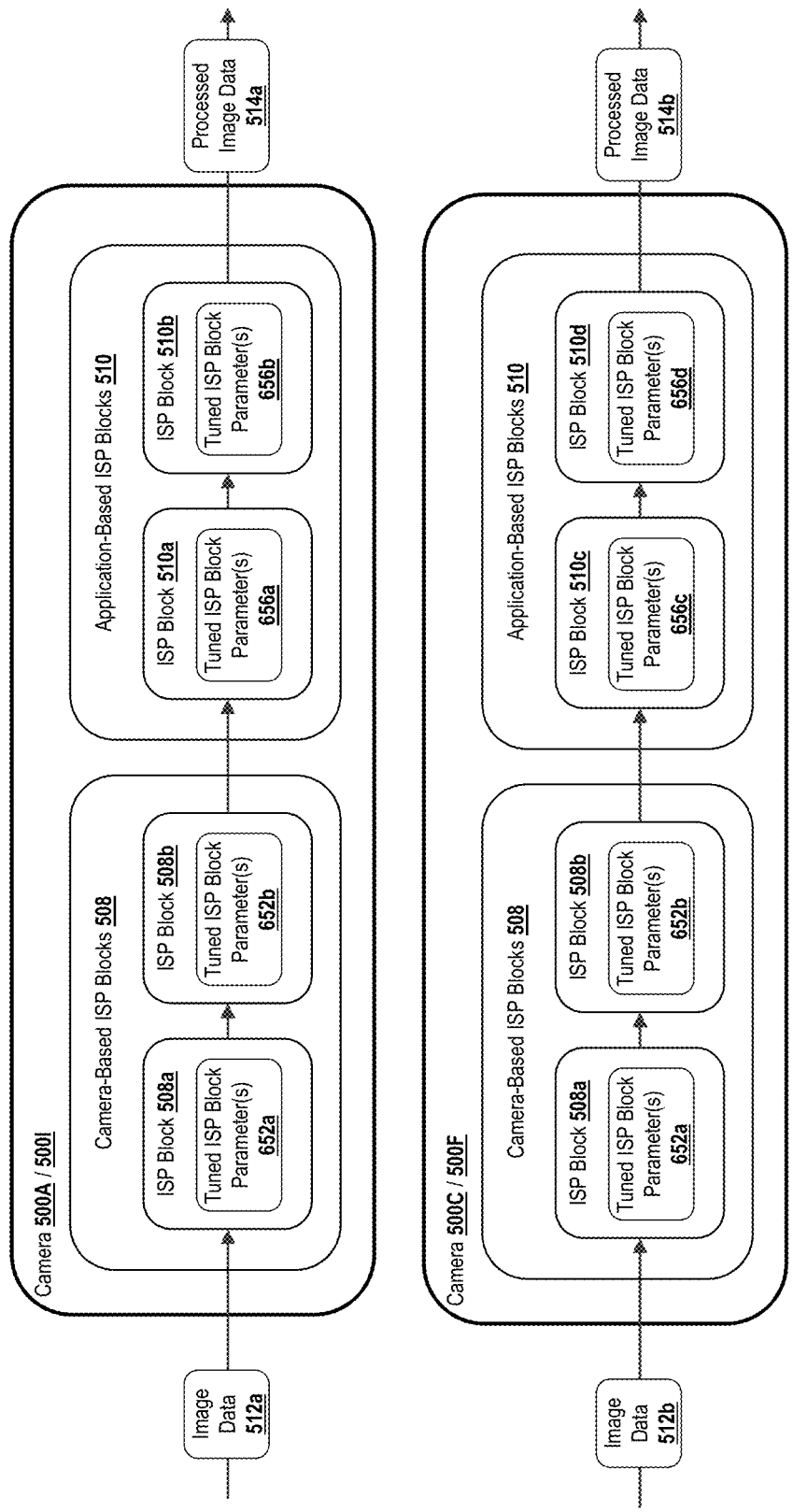

FIG. 6G is a block diagram illustrating an example of different cameras processing image data.

In the illustrated example, the cameras 500A, 500C, 500I, and 500F are the same type of camera in that they at least have the same (moderate) field of view and/or may have similar/same hardware (e.g., from the same manufacturer, same version, specifications, and/or lot, etc.).

Additionally, the cameras 500A and 500I may be used for the same application. For example, the cameras 500A and 500I may both be used to capture front-diagonal views from the vehicle 200. As such, the cameras 500A and 500I may be configured to have the same processing configuration. For example, the cameras 500A and 500I have the same camera-based ISP blocks 508 and the same application-based ISP blocks 510, in the same order, with the same tuned ISP block parameter(s) 652 and 656, respectively. With the same processing configuration, the cameras 500A and 500I may process image data 512a in the same way (with the understanding that the image data 512a will be different for the cameras 500A and 500I based on their respective locations and orientations). For example, the cameras 500A and 500I will perform the same processing in the same order using the same parameters on the data that they receive. As such, the processed image data 514a will have been processed in the same way by either camera 500A or camera 500I.

Similarly, the cameras 500C and 500F may be used for the same application. For example, the cameras 500C and 500F may both be used to capture rear-diagonal views from the vehicle 200. As such, the cameras 500C and 500F may have the same processing configuration. For example, the cameras 500C and 500F have the same camera-based ISP blocks 508 and the same application-based ISP blocks 510, in the same order, with the same tuned ISP block parameter(s) 652 and 656, respectively. With the same processing configuration, the cameras 500C and 500F may process image data 512b in the same way (with the understanding that the image data 512b will be different for the cameras 500C and 500F based on their respective locations and orientations). For example, the cameras 500C and 500F will perform the same processing in the same order using the same ISP block parameters on the image data that they receive. As such, the processed image data 514b will have been processed in the same way by either camera 500C or camera 500F.

As noted, the cameras 500A, 500I, 500C, and 500F are all the same type of camera. However, the cameras 500C and 500F may be used for a different application than the cameras 500A and 500I. Accordingly, although the cameras 500A, 500I, 500C, and 500F share the same configurations for the camera-based ISP blocks 508 (e.g., same number, order, and type of camera-based ISP blocks 508 and the same tuned ISP block parameters 652), the application-based ISP blocks 510 and/or tuned ISP block parameters 652 of the cameras 500A and 500I may be different from the application-based ISP blocks 510 and/or tuned ISP block parameters 652 of the cameras 500C and 500F 500I. As such, the cameras 500C and 500F may have a different processing configuration than the cameras 500A and 500I and may process data differently. With different processing configuration, the processed image data 514a will be processed differently than the processed image data 514b (in addition, it will be understood that the incoming image data 512a and 512b may be different depending on the position and orientation of the cameras 500A/500I and the cameras 500C/500F.

Flow Examples

Figure 7:
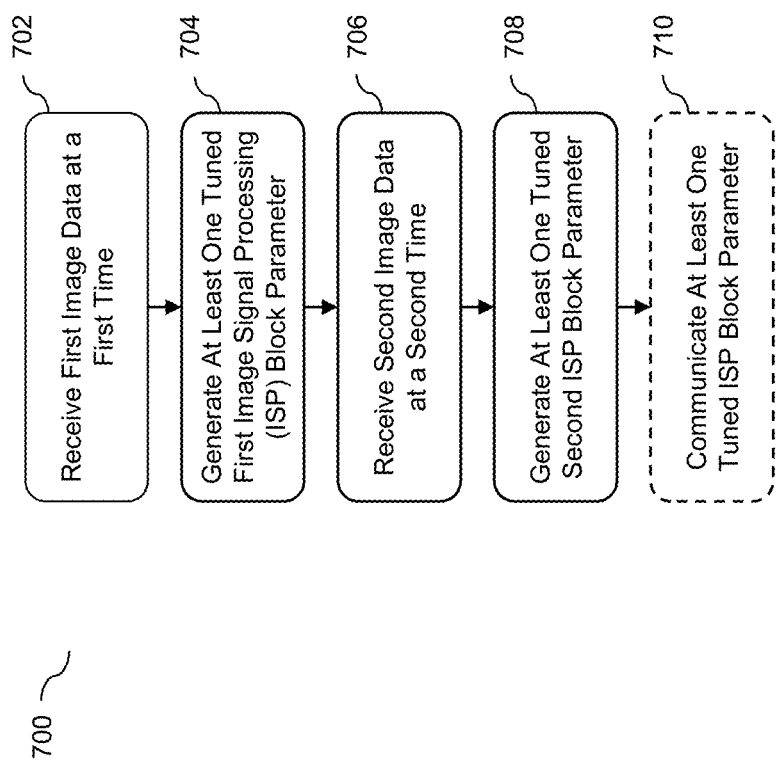
FIG. 7 is a flow diagram of a routine for tuning camera-based and application-based ISP blocks of a camera.
Figure 8:
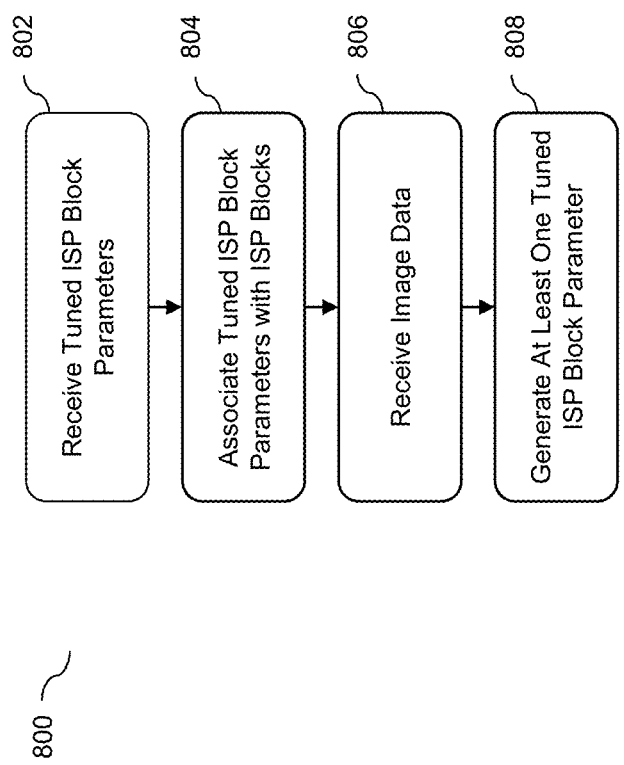
FIG. 8 is a flow diagram of a routine for receiving tuned camera-based ISP blocks and tuning application-based ISP blocks of a camera.
Figure 9:
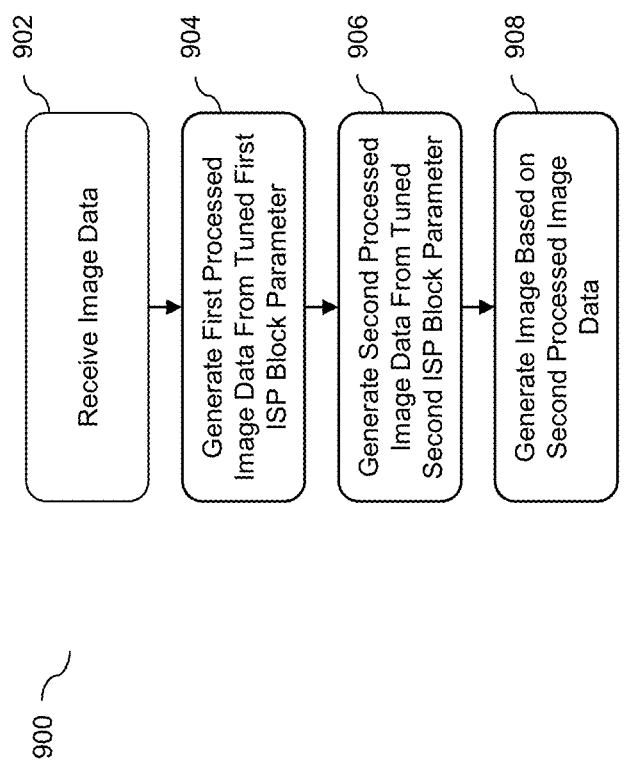
FIG. 9 is a flow diagram of a routine for processing image data using camera-based and application-based ISP blocks.

FIGS. 7-9 are flow diagrams illustrating examples of processes 700, 800, and 900 for tuning cameras in an autonomous vehicle system. In some cases, one or more of the steps described with respect to processes 700, 800, or 900 may be performed (e.g., completely, partially, and/or the like) while cameras 202*a* are coupled to an autonomous vehicle 200, as above. In certain cases, one or more steps described with respect to processes 700, 800, or 900 may be performed (e.g., completely, partially, and/or the like) on cameras 202*a* while cameras 202*a* are located remote from autonomous vehicle 200, such as prior to camera installation.

FIG. 7 is a flow diagram illustrating an example of a routine 700 implemented using at least one processor to tune camera-based ISP blocks and application-based ISP blocks of a camera. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle 200 may be used.

At block 702, an ISP module (e.g., ISP module 504) of a first camera (e.g., camera 500A) receives first image data at a first time. As described herein, the first image data (e.g., image data 512) may be associated with (e.g., received from) a first image sensor (e.g., image sensor 502) of the first camera. In some cases, the first image data is generated by the first image sensor of the first camera at a first time. In certain cases, the first image data includes a first image generated by the first image sensor at the first time.

As described herein, the ISP module may include one or more ISP blocks, such as camera-based ISP blocks and/or application-based ISP blocks. Moreover, some or all of the ISP blocks may include ISP block parameters that determine how a respective ISP block processes incoming data.

At block 704, the ISP module generates at least one tuned (first) ISP block parameter for at least one (first) ISP block of the first camera.

As described herein, the ISP module may generate the tuned ISP block parameter from at least one first ISP block parameter of the at least one first ISP block based on the first image data and at least one first tuning criterion of the first camera. For example, the ISP module may modify the ISP block parameter based on the image data and the first tuning criterion to generate the at least one tuned (first) ISP block parameter.

The first tuning criterion may be camera-based and/or correspond to the type of the camera. As described herein, the (first) ISP blocks may be camera-based ISP blocks that are based on the type of the camera. In some such cases, the first tuning criterion may be based on the type of the camera. For example, the various thresholds used to tune the ISP block parameters and/or the tuned ISP block parameter values may be different depending on the type of the camera. As described herein, the type of the camera may depend on the hardware and/or hardware configuration of the camera (e.g., image sensor type, image sensor manufacturer, image sensor specifications pixel size, pixel count, image sensor filters, lens type/size, field of view, etc.).

The first tuning criterion may also be based on the type of ISP block being tuned. In some cases, the first tuning criterion may include a threshold that is based on the type of the ISP block being tuned. For example, the first tuning criterion may include at least one of a sharpness threshold (e.g., for a sharpness ISP block), noise threshold (e.g., for a noise ISP block), dynamic range threshold (e.g., for a dynamic range ISP block), tone reproduction threshold (e.g., for a tone reproduction ISP block), contrast threshold (e.g., for a contrast ISP block), color accuracy threshold (e.g., for a color accuracy ISP block), distortion threshold (e.g., for a distortion ISP block), vignetting threshold (e.g., for a vignetting ISP block), lateral chromatic aberration (LCA) threshold (e.g., for a LCA ISP block), lens flare threshold (e.g., for a lens flare ISP block), color mode threshold (e.g., for a color mode ISP block), artifacts threshold (e.g., for an artifacts ISP block), quality factor (e.g., for a quality factor ISP block), or a modulation transfer function (MTF) (e.g., for a MTF ISP block) depending on the type of the ISP block being tuned.

As described herein, as part of generating the at least one tuned (first) ISP block parameter, the ISP module (and ISP block being tuned) may process thousands or millions of images in real time. The output of the ISP module (and ISP block) may be compared against one or more thresholds. Based on the comparison, the (first) ISP block parameter may be adjusted or modified.

In some cases, the ISP module may adjust the at least one first ISP block parameter multiple (e.g., hundreds, thousands, or more) times until the at least one first ISP block of the first camera outputs an image (or processed image data) that satisfies an image quality threshold. The image quality threshold may depend on the type of processing performed by the ISP block. For example, if the ISP blocks is for color correction, thousands or millions of images may be processed by the ISP module and the outputs used to modify the (first) ISP block parameter and/or other ISP block parameters of the (first) ISP block) until a color correction threshold is satisfied.

As described herein, the at least one first ISP block may include one ISP block or multiple ISP blocks. For example, the at least one first ISP block may include any one or any combination of a high dynamic range (HDR) merge ISP block, a bad pixel correction ISP block, an image black level correction ISP block, an image shading compensation ISP block, an achromatic aberration correction ISP block, an image white balance modification ISP block, an image demosaic ISP block, an image color correction ISP block, an image tone mapping ISP block, an image de-noising ISP block, an image sharpening ISP block, or an image motion compensation ISP block.

As described herein, some or all of the (first) ISP blocks may include multiple ISP block parameters. In some such cases, the ISP module may tune the multiple ISP block parameters of some or all of the ISP blocks to generate corresponding tuned ISP block parameters. For example, one or more tuned first ISP block parameter may be generated for a particular first ISP block. In some cases, when tuning multiple ISP block parameters of a particular ISP block, the individual ISP block parameters may be adjusted concurrently or sequentially until the tuned ISP block parameters are generated for the respective ISP block.

At block 706, the ISP module receives second image data at a second time. As described herein, the second image data may be associated with (e.g., received from) the first image sensor of the first camera. In some cases, the second image data generated by the first image sensor of the first camera is generated at a time later than the first time. In some cases, the second image data is received after some or all camera-based ISP blocks (or first ISP blocks) have been tuned.

At block 708, the ISP module generates at least one tuned (second) ISP block parameter for at least one (second) ISP block. The second ISP block may be a different type of ISP block than the first ISP block. For example, the first ISP block may be a color correction ISP block and the second ISP block may be a sharpening ISP block.

In some cases, the ISP module generates the at least one tuned second ISP block parameter similar to the way in which the ISP module generates the at least one tuned first ISP block parameter. For example, the ISP module may generate the tuned second ISP block parameter from at least one second ISP block parameter of the at least one second ISP block based on the second image data and at least one second tuning criterion of the first camera. In some cases, the ISP module may modify the second ISP block parameter based on the second image data and the second tuning criterion to generate the at least one tuned (second) ISP block parameter.

The (second) ISP blocks may be application-based ISP blocks that are based on the use of the camera, its expected location or orientation on a vehicle, and/or the objects it is expected to capture. In some such cases, the second tuning criterion may be application based and/or correspond to the application of the camera. For example, the various thresholds used to tune the ISP block parameters and/or generate the tuned ISP block parameter values may be different depending on the application or use case of the camera. The second tuning criterion may also be based on the type of ISP block being tuned, similar to what is described herein with respect to the first tuning criterion.

As described herein, as part of generating the at least one tuned (second) ISP block parameter, the ISP module (and ISP block being tuned) may process thousands or millions of images in real time. This may be done after the first ISP block parameter of the first ISP block has been tuned. The output of the ISP module (and second ISP block) may be compared against one or more thresholds. Based on the comparison, the (second) ISP block parameter may be adjusted or modified.

In some cases, the ISP module may adjust the at least one second ISP block parameter multiple (e.g., hundreds, thousands, or more) times until the at least one second ISP block of the first camera outputs an image (or processed image data) that satisfies an image quality threshold. The image quality threshold may depend on the type of processing performed by the second ISP block. For example, if the second ISP blocks is for image sharpening, thousands or millions of images may be processed by the ISP module and the outputs used to modify the (second) ISP block parameter and/or other ISP block parameters of the (second) ISP block) until a sharpening threshold is satisfied.

As described herein, the at least one second ISP block may include one ISP block or multiple ISP blocks. For example, the at least one second ISP block may include any one or any combination of a high dynamic range (HDR) merge ISP block, a bad pixel correction ISP block, an image black level correction ISP block, an image shading compensation ISP block, an achromatic aberration correction ISP block, an image white balance modification ISP block, an image demosaic ISP block, an image color correction ISP block, an image tone mapping ISP block, an image denoising ISP block, an image sharpening ISP block, or an image motion compensation ISP block.

As described herein, some or all of the (second) ISP blocks may include multiple ISP block parameters. In some such cases, the ISP module may tune the multiple ISP block parameters of some or all of the ISP blocks to generate corresponding tuned ISP block parameters. For example, one or more tuned second ISP block parameter may be generated for a particular second ISP block. In some cases, when tuning multiple ISP block parameters of a particular ISP block, the individual ISP block parameters may be adjusted concurrently or sequentially until the tuned ISP block parameters are generated for the respective ISP block.

Fewer, more, or different blocks may be included in the routine 700. For example, as described herein, the first or second ISP blocks may include multiple ISP block parameters. In some such cases, the routine 700 may include generating a tuned third ISP block parameter for the first and/or second ISP blocks, a tuned fourth ISP block parameter for the first and/or second ISP block, and so on.

Similarly, as described herein, the ISP module may include multiple first ISP blocks and/or multiple second ISP blocks. For example, the ISP module may include multiple first (e.g., camera-based) ISP blocks. In some such cases, the routine 700 may include adjusting at least one third ISP block parameter of a third ISP block of the first camera based on the at least one first tuning criterion to generate at least one tuned third ISP block parameter for the third ISP block of the first camera. As described herein, the first tuning criterion may be based on the type of the camera. In some cases, such as when the tuning criterion is based on the type of the ISP block the routine 700 may include adjusting the at least one third ISP block parameter of the third ISP block based on at least one third tuning criterion to generate the at least one tuned third ISP block parameter for the third ISP block.

As another example, the ISP module may include multiple second (e.g., application-based) ISP blocks. In some such cases, the routine 700 may include adjusting at least one fourth ISP block parameter of a fourth ISP block of the first camera based on the at least one second tuning criterion to generate at least one tuned fourth ISP block parameter for the fourth ISP block. As described herein, the second tuning criterion may be based on the application or use case for the camera. In some cases, such as when the tuning criterion is based on the type of the ISP block, the routine 700 may include adjusting the at least one fourth ISP block parameter of the fourth ISP block based on at least one fourth tuning criterion to generate the at least one tuned fourth ISP block parameter for the fourth ISP block.

In some cases, the routine 700 may include block 710 to communicate the at least one tuned first ISP block parameter to another camera of the same type. It will be understood that the first, second, and third cameras as described below may individually refer to any one of the cameras 500A-500N.

In certain cases, a camera with tuned first ISP block parameters and tuned second ISP block parameters may communicate the tuned first ISP block and tuned second ISP block parameters to an additional camera of the same type that is used for the same application. For example, the first camera may communicate the at least one tuned first ISP block parameter and the at least one tuned second ISP block parameter to a second camera. The second camera may use the at least one tuned first ISP block parameter and the at least one tuned second ISP block parameter to process image data generated by an image sensor of the third camera and generate images for a perception system of an autonomous vehicle.

In another case, the first camera may communicate the at least one tuned first ISP block parameter to a third camera that is of the same type but used for a different application. For example, the first and third cameras may be positioned in different locations and/or at different orientations on vehicle 200 to capture different perspective views of the environment. Accordingly, in some such case, the at least one third ISP block parameter of at least one third ISP block of the third camera may be adjusted, as described herein, based on at least one third tuning criterion associated with the third camera to form at least one tuned third ISP block parameter for a at least one third ISP block of the third camera. As described herein, the third tuning criterion may be based on at least one of a mounting location/orientation for the third camera on an autonomous vehicle or objects to be detected from images generated by the third camera.

In this example, the at least one third ISP block of the third camera may include multiple third ISP blocks. In some such cases, the ISP block parameters of some or all of the third ISP blocks may be tuned. In addition, as described herein, some or all of the third ISP blocks may include multiple ISP block parameters. In some such cases, some or all of the ISP block parameters may be adjusted.

In another case, the third camera may further communicate the at least one tuned first ISP block parameter and the at least one tuned third ISP block parameter to a fourth camera. The fourth camera may use the at least one tuned first ISP block parameter and the at least one tuned third ISP block parameter to process image data generated by the fourth camera and generate images for a perception system of an autonomous vehicle.

In another case, the first camera may communicate the at least one tuned first image signal processor parameter to a fifth camera that is the same type but is used for a third application that is different from the first and second applications. In this example, at least one fifth ISP block parameter of a fifth ISP block of the fifth camera may be adjusted based on at least one fifth tuning criterion associated with the fifth camera to form at least one tuned fifth ISP block parameter for the fifth ISP block of the fifth camera.

As described herein, the ISP blocks, ISP modules, and cameras may be used to generate processed image data or images. For example, first image signal processors of the first camera and second camera may use the at least one tuned first ISP block parameter and the at least one tuned second ISP block parameter to process first and second image data, respectively, image signal processors of the second and third camera may use the at least one tuned first ISP block parameter and the at least one tuned second ISP block parameter to process third and fourth image data, respectively, and image signal processor of the fifth camera may use the at least one tuned first ISP block parameter and the at least one tuned fifth ISP block parameter to process image data, etc., for a perception system of an autonomous vehicle. The perception system may use the processed image data from the various cameras to detect objects in the vehicle environment, may use the detected objects to navigate the environment.

FIG. 8 is a flow diagram illustrating an example of a routine 800 implemented using at least one processor to receive tuned camera-based ISP blocks and tune application-based ISP blocks of a camera. The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle 200 may be used.

At block 802, an ISP module (e.g., ISP module 504) of a camera (e.g., camera 500C) receives (first) tuned ISP block parameters. As described herein, the tuned ISP block parameters may be received from another camera (e.g., camera 500A) of the same type. As described herein, the type of camera may depend on the hardware and/or hardware configuration of the camera (e.g., image sensor type, image sensor manufacturer, image sensor specifications pixel size, pixel count, image sensor filters, lens type/size, field of view, etc.). As described herein, receiving (first) tuned ISP block parameters includes flashing, installing, programming, or otherwise copying the to the ISP module.

In certain cases, the tuned (first) ISP block parameters may be tuned according to blocks 702-704 of process 700. As described herein, the tuned (first) block ISP parameters may be tuned based on at least one first tuning criterion. For example, the first tuning criterion may include at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF) depending on the type of the ISP block being tuned.

At block 804, the ISP module associates the tuned (first) ISP block parameters with (first) ISP blocks of the camera.

As described herein, the ISP module may include one or more ISP blocks, such as camera-based ISP blocks and/or application-based ISP blocks. Moreover, some or all of the ISP blocks may include ISP block parameters that determine how a respective ISP block processes incoming data.

In certain cases, the (first) ISP blocks may be camera-based ISP blocks that are based on the type of the camera. In some such cases, the first tuning criterion may be based on the type of the camera. For example, the various thresholds used to tune the ISP block parameters may be different depending on the type of the camera. As described herein, the type of the camera may depend on the hardware and/or hardware configuration of the camera (e.g., image sensor type, image sensor manufacturer, image sensor specifications pixel size, pixel count, image sensor filters, lens type/size, field of view, etc.).

At block 806, the ISP module receives image data, similar to block 706 of FIG. 7. As described herein, the image data may be associated with (e.g., received from) an image sensor of the camera. In certain cases, the image data is generated by the image sensor of the camera.

At block 808, the ISP module generates at least one tuned (second) ISP block parameter for at least one (second) ISP block similar to block 708 of FIG. 7. The second ISP block may be a different type of ISP block than the first ISP block. For example, the first ISP block may be an image shading compensation ISP block and the second ISP block may be a contrast ISP block.

In some cases, the ISP module may generate the tuned (second) ISP block parameter from at least one (second) ISP block parameter of the at least one (second) ISP block based on the image data and at least one second tuning criterion of the camera. In some cases, the ISP module may modify the (second) ISP block parameter based on the second image data and the second tuning criterion to generate the at least one tuned (second) ISP block parameter. As described herein, as part of generating the at least one tuned (second) ISP block parameter, the ISP module (and ISP block being tuned) may process thousands or millions of images in real time. The output of the ISP module (and second ISP block) may be compared against one or more thresholds. Based on the comparison, the (second) ISP block parameter may be adjusted or modified.

In some cases, the ISP module may adjust the at least one (second) ISP block parameter multiple (e.g., hundreds, thousands, or more) times until the at least one (second) ISP block of the camera outputs an image (or processed image data) that satisfies an image quality threshold. The image quality threshold may depend on the type of processing performed by the second ISP block. For example, if the second ISP blocks is for contrast, thousands or millions of images may be processed by the ISP module and the outputs used to modify the (second) ISP block parameter and/or other ISP block parameters of the (second) ISP block until a contrast threshold is satisfied.

In an example, the at least one second ISP block comprises at least one of a high dynamic range (HDR) merge ISP block, a bad pixel correction ISP block, an image black level correction ISP block, an image shading compensation ISP block, an achromatic aberration correction ISP block, an image white balance modification ISP block, an image demosaic ISP block, an image color correction ISP block, an image tone mapping ISP block, an image de-noising ISP block, an image sharpening ISP block, or an image motion compensation ISP block.

In some cases, the ISP module may include multiple (second) ISP blocks. In some such cases, generating the at least one tuned (second) ISP block parameter as described above may include generating multiple tuned (second) ISP parameters for the second ISP blocks. In some such cases, a particular tuned (second) ISP block parameter of the plurality of tuned (second) ISP parameters may be generated for a particular (second) ISP block of the plurality of (second) ISP blocks.

In certain cases, the (second) ISP blocks may be application-based ISP blocks that are based on the use of the camera, its expected location or orientation on a vehicle, and/or the objects it is expected to capture. In some such cases, the second tuning criterion may be based on the application of the camera. For example, the various thresholds used to tune the ISP block parameters may be different depending on the application or use case of the camera.

In certain cases, the at least one of the plurality of first ISP blocks and the at least one second ISP block perform a same processing function using different values for ISP block parameters. For example, although the first ISP block and the second ISP block may be the same type of block, the first and second ISP blocks have been tuned according to the first and second tuning criterion, respectively, and may have different values for ISP block parameters.

As another example, the ISP module may include multiple second (e.g., application-based) ISP blocks. In some such cases, the routine 700 may include adjusting at least one fourth ISP block parameter of a fourth ISP block of the first camera based on the at least one second tuning criterion to generate at least one tuned fourth ISP block parameter for the fourth ISP block. As described herein, the second tuning criterion may be based on the application or use case for the camera. In some cases, such as when the tuning criterion is based on the type of the ISP block, the routine 700 may include adjusting the at least one fourth ISP block parameter of the fourth ISP block based on at least one fourth tuning criterion to generate the at least one tuned fourth ISP block parameter for the fourth ISP block.

In certain cases, a camera with tuned first ISP block parameters and tuned second ISP block parameters may communicate the tuned first ISP block and tuned second ISP block parameters to an additional camera of the same type that is used for the same application. For example, the (first) camera may communicate the at least one tuned first ISP block parameter and the at least one tuned second ISP block parameter to a second camera. The second camera may use the at least one tuned first ISP block parameter and the at least one tuned second ISP block parameter to process image data generated by an image sensor of the third camera and generate images for a perception system of an autonomous vehicle.

As described herein, the ISP blocks, ISP modules, and cameras may be used to generate processed image data or images. For example, an image signal processor of the camera may use the plurality of tuned (first) ISP block parameters to process the image data and generate first processed image data. In this example, the image signal processor may use the at least one (second) ISP block parameter of the at least one (second) ISP block to process the first processed image data and generate second processed image data. In another example, the image signal processor may use the plurality of tuned ISP first ISP block parameters and the at least one tuned second ISP block parameter to process the image data and generate first and second images for a perception system of an autonomous vehicle. The perception system may use the processed image data from the various cameras to detect objects in the vehicle environment, may use the detected objects to navigate the environment.

Fewer, more, or different blocks may be included in the routine 800. For example, similar to routine 700, routine 800 may include a block to communicate some or all of the tuned ISP block parameters to another camera.

FIG. 9 is a flow diagram illustrating an example of a routine 900 implemented using at least one processor to process image data using camera-based ISP blocks and application-based ISP blocks of a camera. The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle 200 may be used.

At block 902, an ISP module (e.g., ISP module 504) of a camera (e.g., camera 500A) receives image data. As described herein, the image data (e.g., image data 512) may be associated with (e.g., received from) an image sensor (e.g., image sensor 502) of the camera.

As described herein, the ISP module may include one or more ISP blocks, such as camera-based ISP blocks and/or application-based ISP blocks. Moreover, some or all of the ISP blocks may include ISP block parameters that determine how a respective ISP block processes incoming data.

At block 904, the ISP module generates first processed image data from at least one tuned first ISP block parameter. In an example, the first processed image data may be generated using the tuned first ISP block parameter of a first ISP block. In the example, the tuned first ISP block parameter may be based on a first tuning criterion.

In some cases, the first tuning criterion may correspond to a type of the image sensor or a type of the image signal processor. For example, the first tuning criterion may include at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF) depending on the type of the ISP block being tuned.

At block 906, the ISP module generates second processed image data from at least one tuned second ISP block parameter. In an example, the second processed image data may be generated using the tuned second ISP block parameter of a second ISP block. In the example, the tuned second ISP block parameter may be based on a second tuning criterion. As described herein, the second tuning criterion may be different from the first tuning criterion.

In some cases, the second tuning criterion may correspond to at least one of a mounting location for the camera on an autonomous vehicle or objects to be detected from images generated by the first camera.

In certain cases, the first ISP block and second ISP block may perform the same processing task on the image data using different values for ISP block parameters. For example, the first and second ISP blocks may both be one of a high dynamic range (HDR) merge ISP block, a bad pixel correction ISP block, an image black level correction ISP block, an image shading compensation ISP block, an achromatic aberration correction ISP block, an image white balance modification ISP block, an image demosaic ISP block, an image color correction ISP block, an image tone mapping ISP block, an image de-noising ISP block, an image sharpening ISP block, or an image motion compensation ISP block. In the example, although the first ISP block and the second ISP block may be the same type of block, the first and second ISP blocks have been tuned according to the first and second tuning criterion, respectively, and may have different values for ISP block parameters.

As another example, the ISP module may contain multiple ISP blocks tuned based on the first criterion that generate the first processed image data. For example, the ISP module may generate the first processed image data from the image data using a tuned third ISP block parameter of a third ISP block, wherein the at least one third ISP block parameter is tuned based on a first tuning criterion. In the example, the first ISP block and the third ISP block may perform different processing tasks on the image data. For example, the first ISP block may be an image tone mapping ISP block and the third ISP block may be an image denoising ISP block, and may both be tuned based on the type of image sensor or type of image signal processor.

As another example, the ISP module may contain multiple ISP blocks tuned by the second criterion that generate the second processed image data. For example, the ISP module may generate the second processed image data from the first processed image data using a tuned fourth ISP block parameter of a fourth ISP block, wherein the at least one fourth ISP block parameter is tuned based on a second tuning criterion. In the example, the second ISP block and the fourth ISP block may perform different processing tasks on the image data. In another case, the fourth ISP block and the third ISP block may perform the same or different processing tasks on the image data. For example, although the fourth and third ISP blocks may perform the same processing task, each are tuned based on the first and second tuning criterion, respectively.

As described herein, the ISP blocks, ISP modules, and cameras may be used to generate processed image data or images. For example, the image generated by the image processor may be generated for a perception system of an autonomous vehicle. The perception system may use the processed image data from the various cameras to detect objects in the vehicle environment, may use the detected objects to navigate the environment.

Various non-limiting examples of the disclosure can be described by the following clauses:

Clause 1. A method, comprising: receiving first image data at a first time, wherein the first image data is associated with a first image sensor of a first camera; generating at least one tuned first image signal processing (ISP) block parameter for at least one first ISP block of the first camera from at least one first ISP block parameter of the at least one first ISP block based on the first image data and at least one first tuning criterion of the first camera; receiving second image data at a second time, wherein the second image data is associated with the first image sensor; and generating at least one tuned second ISP block parameter for at least one second ISP block of the first camera from at least one second ISP block parameter of the at least one second ISP block based on the second image data and at least one second tuning criterion of the first camera.

Clause 2. The method of clause 1, wherein a first image signal processor of the first camera uses the at least one tuned first ISP block parameter and the at least one tuned second ISP block parameter to process the first image data and the second image data, and generate first images for a perception system of an autonomous vehicle, wherein the perception system detects objects in the first images, and wherein the autonomous vehicle uses the detected objects to navigate.

Clause 3. The method of any of clauses 1-2, comprising communicating the at least one tuned first ISP block parameter and the at least one tuned second ISP block parameter to a third camera, wherein the third camera uses the at least one tuned first ISP block parameter and the at least one tuned second ISP block parameter to process at least one third image data generated by a third image sensor of the third camera and generate images for a perception system of an autonomous vehicle.

Clause 4. The method of any of clauses 1-3, wherein the second tuning criterion is based on at least one of a mounting location for the first camera on an autonomous vehicle or objects to be detected from images generated by the first camera.

Clause 5. The method of any of clauses 1-4, wherein the at least one first ISP block and the at least one second ISP block perform a same processing function.

Clause 6. The method of any of clauses 1-5, wherein the at least one first ISP block comprises a plurality of first ISP blocks, wherein generating the at least one tuned first ISP block parameter comprises generating a plurality of tuned first ISP parameters for the plurality of first ISP blocks, and wherein a particular tuned first ISP block parameter of the plurality of tuned first ISP parameters is generated for a particular first ISP block of the plurality of first ISP blocks.

Clause 7. The method of any of clauses 1-6, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 8. The method of any of clauses 1-7, wherein the at least one first tuning criterion includes at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF).

Clause 9. The method of any of clauses 1-8, wherein the at least one first ISP block comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 10. The method of any of clauses 1-9, wherein generating the at least one tuned first ISP block parameter comprises adjusting the at least one first ISP block parameter until the at least one first ISP block of the first camera outputs an image that satisfies an image quality threshold.

Clause 11. The method of any of clauses 1-10, further comprising adjusting at least one fourth ISP block parameter of a fourth ISP block of the first camera based on the at least one second tuning criterion to generate at least one tuned fourth ISP block parameter for the fourth ISP block of the first camera.

Clause 12. The method of any of clause 1-10, further comprising communicating the at least one tuned first ISP block parameter to a second camera, wherein at least one third ISP block parameter of at least one third ISP block of the second camera is adjusted based on at least one third tuning criterion associated with the second camera to form at least one tuned third ISP block parameter for the at least one third ISP block of the second camera.

Clause 13. The method of clause 12, wherein the at least one third ISP block comprises a plurality of third ISP blocks, wherein generating the at least one tuned third ISP block parameter comprises generating a plurality of tuned third ISP parameters for the plurality of third ISP blocks, and wherein a particular tuned third ISP block parameter of the plurality of tuned third ISP parameters is generated for a particular third ISP block of the plurality of third ISP blocks.

Clause 14. The method of any of clauses 12-13, further comprising communicating the at least one tuned first ISP block parameter and the at least one tuned third ISP block parameter to a third camera, wherein the third camera uses the at least one tuned first ISP block parameter and the at least one tuned third ISP block parameter to process at least one third image data generated by the third camera and generate images for a perception system of an autonomous vehicle.

Clause 15. The method of any of clauses 12-14, wherein the third tuning criterion is at least one of a mounting location for the second camera on an autonomous vehicle or objects to be detected from images generated by the second camera.

Clause 16. The method of any of clauses 12-15, wherein the at least one first tuning criterion is based on hardware of the first camera and the second camera.

Clause 17. The method of clause 16, wherein the first camera and the second camera include a same type of image signal processor and a same type of image sensor.

Clause 18. The method of clause 8, further comprising communicating the at least one tuned first image signal processor parameter to a third camera, wherein at least one fourth ISP block parameter of a fourth ISP block of the third camera is adjusted based on at least one fourth tuning criterion associated with the third camera to form at least one tuned fourth ISP block parameter for the fourth ISP block of the third camera.

Clause 19. The method of any of clauses 1-18, wherein a first image signal processor of the first camera uses the at least one tuned first ISP block parameter and the at least one tuned second ISP block parameter to process the first image data and generate first images for a perception system of an autonomous vehicle, wherein a second image signal processor of the second camera uses the at least one tuned first ISP block parameter and the at least one tuned second ISP block parameter to process second image data and generate second images for the perception system, and wherein the perception system detects objects in the first and second images, wherein the autonomous vehicle uses the detected objects to navigate.

Clause 20. A system, comprising: a data store storing computer-executable instructions; and a processor configured to: receive first image data at a first time, wherein the first image data is associated with a first image sensor of a first camera; generate at least one tuned first image signal processing (ISP) block parameter for at least one first ISP block of the first camera from at least one first ISP block parameter of the at least one first ISP block based on the first image data and at least one first tuning criterion of the first camera; receive second image data at a second time, wherein the second image data is associated with the first image sensor; and generate at least one tuned second ISP block parameter for at least one second ISP block of the first camera from at least one second ISP block parameter of the at least one second ISP block based on the second image data and at least one second tuning criterion of the first camera.

Clause 21. The system of clause 20, wherein a first image signal processor of the first camera uses the at least one tuned first ISP block parameter and the at least one tuned second ISP block parameter to process the first image data and the second image data, and generate first images for a perception system of an autonomous vehicle, wherein the perception system detects objects in the first images, and wherein the autonomous vehicle uses the detected objects to navigate.

Clause 22. The system of any of clauses 20-21, wherein the processor is further configured to communicate the at least one tuned first ISP block parameter and the at least one tuned second ISP block parameter to a third camera, wherein the third camera uses the at least one tuned first ISP block parameter and the at least one tuned second ISP block parameter to process at least one third image data generated by a third image sensor of the third camera and generate images for a perception system of an autonomous vehicle.

Clause 23. The system of any of clauses 20-22, wherein the second tuning criterion is based on at least one of a mounting location for the first camera on an autonomous vehicle or objects to be detected from images generated by the first camera.

Clause 24. The system of any of clauses 20-23, wherein the at least one first ISP block and the at least one second ISP block perform a same processing function.

Clause 25. The system of any of clauses 20-24, wherein the at least one first ISP block comprises a plurality of first ISP blocks, wherein generating the at least one tuned first ISP block parameter comprises generating a plurality of tuned first ISP parameters for the plurality of first ISP blocks, and wherein a particular tuned first ISP block parameter of the plurality of tuned first ISP parameters is generated for a particular first ISP block of the plurality of first ISP blocks.

Clause 26. The system of any of clauses 20-25, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 27. The system of any of clauses 20-26, wherein the at least one first tuning criterion includes at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF).

Clause 28. The system of any of clauses 20-27, wherein the at least one first ISP block comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 29. The system of any of clauses 20-28, wherein generating the at least one tuned first ISP block parameter comprises adjusting the at least one first ISP block parameter until the at least one first ISP block of the first camera outputs an image that satisfies an image quality threshold.

Clause 30. The system of any of clauses 20-29, wherein the processor is further configured to adjust least one fourth ISP block parameter of a fourth ISP block of the first camera based on the at least one second tuning criterion to generate at least one tuned fourth ISP block parameter for the fourth ISP block of the first camera.

Clause 31. The system of any of clauses 20-30, wherein the processor is further configured to communicate the at least one tuned first ISP block parameter to a second camera, wherein at least one third ISP block parameter of at least one third ISP block of the second camera is adjusted based on at least one third tuning criterion associated with the second camera to form at least one tuned third ISP block parameter for the at least one third ISP block of the second camera.

Clause 32. The system of clause 31, wherein the at least one third ISP block comprises a plurality of third ISP blocks, wherein generating the at least one tuned third ISP block parameter comprises generating a plurality of tuned third ISP parameters for the plurality of third ISP blocks, and wherein a particular tuned third ISP block parameter of the plurality of tuned third ISP parameters is generated for a particular third ISP block of the plurality of third ISP blocks.

Clause 33. The system of any of clauses 31-32, wherein the processor is further configured to communicate the at least one tuned first ISP block parameter and the at least one tuned third ISP block parameter to a third camera, wherein the third camera uses the at least one tuned first ISP block parameter and the at least one tuned third ISP block parameter to process at least one third image data generated by the third camera and generate images for a perception system of an autonomous vehicle.

Clause 34. The system of any of clauses 31-33, wherein the third tuning criterion is at least one of a mounting location for the second camera on an autonomous vehicle or objects to be detected from images generated by the second camera.

Clause 35. The system of any of clauses 31-34, wherein the at least one first tuning criterion is based on hardware of the first camera and the second camera.

Clause 36. The system of clause 35, wherein the first camera and the second camera include a same type of image signal processor and a same type of image sensor.

Clause 37. The system of clause 27, wherein the processor is further configured to communicate the at least one tuned first image signal processor parameter to a third camera, wherein at least one fourth ISP block parameter of a fourth ISP block of the third camera is adjusted based on at least one fourth tuning criterion associated with the third camera to form at least one tuned fourth ISP block parameter for the fourth ISP block of the third camera.

Clause 38. The system of any of clauses 20-37, wherein a first image signal processor of the first camera uses the at least one tuned first ISP block parameter and the at least one tuned second ISP block parameter to process the first image data and generate first images for a perception system of an autonomous vehicle, wherein a second image signal processor of the second camera uses the at least one tuned first ISP block parameter and the at least one tuned second ISP block parameter to process second image data and generate second images for the perception system, and wherein the perception system detects objects in the first and second images, wherein the autonomous vehicle uses the detected objects to navigate.

Clause 39. Non-transitory computer-readable media comprising computer-executable instructions that, when executed by a computing system, causes the computing system to: receive first image data at a first time, wherein the first image data is associated with a first image sensor of a first camera; generate at least one tuned first image signal processing (ISP) block parameter for at least one first ISP block of the first camera from at least one first ISP block parameter of the at least one first ISP block based on the first image data and at least one first tuning criterion of the first camera; receive second image data at a second time, wherein the second image data is associated with the first image sensor; and generate at least one tuned second ISP block parameter for at least one second ISP block of the first camera from at least one second ISP block parameter of the at least one second ISP block based on the second image data and at least one second tuning criterion of the first camera.

Clause 40. The non-transitory computer-readable media of clause 39, wherein a first image signal processor of the first camera uses the at least one tuned first ISP block parameter and the at least one tuned second ISP block parameter to process the first image data and the second image data, and generate first images for a perception system of an autonomous vehicle, wherein the perception system detects objects in the first images, and wherein the autonomous vehicle uses the detected objects to navigate.

Clause 41. The non-transitory computer-readable media of any of clauses 39-40, wherein execution of the computer-executable instructions further cause the computing system to communicate the at least one tuned first ISP block parameter and the at least one tuned second ISP block parameter to a third camera, wherein the third camera uses the at least one tuned first ISP block parameter and the at least one tuned second ISP block parameter to process at least one third image data generated by a third image sensor of the third camera and generate images for a perception system of an autonomous vehicle.

Clause 42. The non-transitory computer-readable media of any of clauses 39-41, wherein the second tuning criterion is based on at least one of a mounting location for the first camera on an autonomous vehicle or objects to be detected from images generated by the first camera.

Clause 43. The non-transitory computer-readable media of any of clauses 39-42, wherein the at least one first ISP block and the at least one second ISP block perform a same processing function.

Clause 44. The non-transitory computer-readable media of any of clauses 39-43, wherein the at least one first ISP block comprises a plurality of first ISP blocks, wherein generating the at least one tuned first ISP block parameter comprises generating a plurality of tuned first ISP parameters for the plurality of first ISP blocks, and wherein a particular tuned first ISP block parameter of the plurality of tuned first ISP parameters is generated for a particular first ISP block of the plurality of first ISP blocks.

Clause 45. The non-transitory computer-readable media of any of clauses 39-44, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 46. The non-transitory computer-readable media of any of clauses 39-45, wherein the at least one first tuning criterion includes at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF).

Clause 47. The non-transitory computer-readable media of any of clauses 39-46, wherein the at least one first ISP block comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 48. The non-transitory computer-readable media of any of clauses 39-47, wherein generating the at least one tuned first ISP block parameter comprises adjusting the at least one first ISP block parameter until the at least one first ISP block of the first camera outputs an image that satisfies an image quality threshold.

Clause 49. The non-transitory computer-readable media of any of clauses 39-48 wherein execution of the computer-executable instructions further cause the computing system to adjust at least one fourth ISP block parameter of a fourth ISP block of the first camera based on the at least one second tuning criterion to generate at least one tuned fourth ISP block parameter for the fourth ISP block of the first camera.

Clause 50. The non-transitory computer-readable media of any of clauses 39-49, wherein execution of the computer-executable instructions further cause the computing system to communicate the at least one tuned first ISP block parameter to a second camera, wherein at least one third ISP block parameter of at least one third ISP block of the second camera is adjusted based on at least one third tuning criterion associated with the second camera to form at least one tuned third ISP block parameter for the at least one third ISP block of the second camera.

Clause 51. The non-transitory computer-readable media of clause 50, wherein the at least one third ISP block comprises a plurality of third ISP blocks, wherein generating the at least one tuned third ISP block parameter comprises generating a plurality of tuned third ISP parameters for the plurality of third ISP blocks, and wherein a particular tuned third ISP block parameter of the plurality of tuned third ISP parameters is generated for a particular third ISP block of the plurality of third ISP blocks.

Clause 52. The non-transitory computer-readable media of any of clauses 50-51, wherein execution of the computer-executable instructions further cause the computing system to communicate the at least one tuned first ISP block parameter and the at least one tuned third ISP block parameter to a third camera, wherein the third camera uses the at least one tuned first ISP block parameter and the at least one tuned third ISP block parameter to process at least one third image data generated by the third camera and generate images for a perception system of an autonomous vehicle.

Clause 53. The non-transitory computer-readable media of any of clauses 50-52, wherein the third tuning criterion is at least one of a mounting location for the second camera on an autonomous vehicle or objects to be detected from images generated by the second camera.

Clause 54. The non-transitory computer-readable media of any of clauses 50-53, wherein the at least one first tuning criterion is based on hardware of the first camera and the second camera.

Clause 55. The non-transitory computer-readable media of clause 54, wherein the first camera and the second camera include a same type of image signal processor and a same type of image sensor.

Clause 56. The non-transitory computer-readable media of clause 46, wherein execution of the computer-executable instructions further cause the computing system to communicate the at least one tuned first image signal processor parameter to a third camera, wherein at least one fourth ISP block parameter of a fourth ISP block of the third camera is adjusted based on at least one fourth tuning criterion associated with the third camera to form at least one tuned fourth ISP block parameter for the fourth ISP block of the third camera.

Clause 57. The non-transitory computer-readable media of any of clauses 39-56, wherein a first image signal processor of the first camera uses the at least one tuned first ISP block parameter and the at least one tuned second ISP block parameter to process the first image data and generate first images for a perception system of an autonomous vehicle, wherein a second image signal processor of the second camera uses the at least one tuned first ISP block parameter and the at least one tuned second ISP block parameter to process second image data and generate second images for the perception system, and wherein the perception system detects objects in the first and second images, wherein the autonomous vehicle uses the detected objects to navigate.

Clause 58. A method, comprising: receiving a plurality of tuned first image signal processing (ISP) block parameters, wherein the plurality of tuned first ISP block parameters are tuned based on at least one first tuning criterion; associating the plurality of tuned first ISP block parameters with a plurality of first ISP blocks of a camera, wherein at least one tuned first ISP block parameter of the plurality of tuned first ISP block parameters is associated with at least one first ISP block of the plurality of first ISP blocks; receiving image data associated with an image sensor of the camera; and generating at least one tuned second ISP block parameter for at least one second ISP block of the camera from at least one second ISP block parameter of the second ISP block based on at least one second tuning criterion.

Clause 59. The method of clause 58, wherein an image signal processor of the camera uses the plurality of tuned first ISP block parameters to process the image data and generates first processed image data.

Clause 60. The method of any of clauses 58-59, wherein the image signal processor of the camera uses the at least one second ISP block parameter of the at least one second ISP block to process the first processed image data, and generates second processed image data.

Clause 61. The method of any of clauses 58-60, wherein the second tuning criterion is based on at least one of a mounting location for the camera on an autonomous vehicle or objects to be detected from images generated by the camera.

Clause 62. The method of any of clauses 58-61, wherein the at least one of the plurality of first ISP blocks and the at least one second ISP block perform a same processing function using different values for ISP block parameters.

Clause 63. The method of any of clauses 58-62, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 64. The method of any of clauses 58-63, wherein the plurality of tuned second ISP blocks comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 65. The method of any of clauses 58-64, wherein generating the at least one tuned second ISP block parameter comprises adjusting the at least one second ISP block parameter until the at least one second ISP block of the camera outputs an image that satisfies an image quality threshold.

Clause 66. The method of any of clauses 58-65, further comprising adjusting at least one fourth ISP block parameter of a fourth ISP block of the camera based on the at least one second tuning criterion to generate at least one tuned fourth ISP block parameter for the fourth ISP block of the camera.

Clause 67. The method of any of clauses 58-66, further comprising communicating the plurality of tuned first ISP block parameters and the at least one tuned second ISP block parameter to a third camera, wherein the third camera uses the plurality of tuned first ISP block parameters and the at least one tuned second ISP block parameter to process at least one third image data generated by a third image sensor of the third camera and generate images for a perception system of an autonomous vehicle.

Clause 68. The method of any of clauses 58-67, wherein a first image signal processor of the camera uses the plurality of tuned first ISP block parameters and the at least one tuned second ISP block parameter to process the image data and generate first images for a perception system of an autonomous vehicle, wherein a second image signal processor of the second camera uses the plurality of tuned first ISP block parameters and the at least one tuned second ISP block parameter to process second image data and generate second images for the perception system, and wherein the perception system detects objects in the first and second images, wherein the autonomous vehicle uses the detected objects to navigate.

Clause 69. A system, comprising: a data store storing computer-executable instructions; and a processor configured to: receive a plurality of tuned first image signal processing (ISP) block parameters, wherein the plurality of tuned first ISP block parameters are tuned based on at least one first tuning criterion; associate the plurality of tuned first ISP block parameters with a plurality of first ISP blocks of a camera, wherein at least one tuned first ISP block parameter of the plurality of tuned first ISP block parameters is associated with at least one first ISP block of the plurality of first ISP blocks; receive image data associated with an image sensor of the camera; and generate at least one tuned second ISP block parameter for at least one second ISP block of the camera from at least one second ISP block parameter of the second ISP block based on at least one second tuning criterion.

Clause 70. The system of clause 69, wherein an image signal processor of the camera uses the plurality of tuned first ISP block parameters to process the image data and generates first processed image data.

Clause 71. The system of any of clauses 69-70, wherein the image signal processor of the camera uses the at least one second ISP block parameter of the at least one second ISP block to process the first processed image data, and generates second processed image data.

Clause 72. The system of any of clauses 69-71, wherein the second tuning criterion is based on at least one of a mounting location for the camera on an autonomous vehicle or objects to be detected from images generated by the camera.

Clause 73. The system of any of clauses 69-72, wherein the at least one of the plurality of first ISP blocks and the at least one second ISP block perform a same processing function using different values for ISP block parameters.

Clause 74. The system of any of clauses 69-73, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 75. The system of any of clauses 69-74, wherein the plurality of tuned second ISP blocks comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 76. The system of any of clauses 69-75, wherein generating the at least one tuned second ISP block parameter comprises adjusting the at least one second ISP block parameter until the at least one second ISP block of the camera outputs an image that satisfies an image quality threshold.

Clause 77. The system of any of clauses 69-76, wherein the processor is further configured to adjust at least one fourth ISP block parameter of a fourth ISP block of the camera based on the at least one second tuning criterion to generate at least one tuned fourth ISP block parameter for the fourth ISP block of the camera.

Clause 78. The system of any of clauses 69-77, wherein the processor is further configured to communicate the plurality of tuned first ISP block parameters and the at least one tuned second ISP block parameter to a third camera, wherein the third camera uses the plurality of tuned first ISP block parameters and the at least one tuned second ISP block parameter to process at least one third image data generated by a third image sensor of the third camera and generate images for a perception system of an autonomous vehicle.

Clause 79. The system of any of clauses 69-78, wherein a first image signal processor of the camera uses the plurality of tuned first ISP block parameters and the at least one tuned second ISP block parameter to process the image data and generate first images for a perception system of an autonomous vehicle, wherein a second image signal processor of the second camera uses the plurality of tuned first ISP block parameters and the at least one tuned second ISP block parameter to process second image data and generate second images for the perception system, and wherein the perception system detects objects in the first and second images, wherein the autonomous vehicle uses the detected objects to navigate.

Clause 80. Non-transitory computer-readable media comprising computer-executable instructions that, when executed by a computing system, causes the computing system to: receive a plurality of tuned first image signal processing (ISP) block parameters, wherein the plurality of tuned first ISP block parameters are tuned based on at least one first tuning criterion; associate the plurality of tuned first ISP block parameters with a plurality of first ISP blocks of a camera, wherein at least one tuned first ISP block parameter of the plurality of tuned first ISP block parameters is associated with at least one first ISP block of the plurality of first ISP blocks; receive image data associated with an image sensor of the camera; and generate at least one tuned second ISP block parameter for at least one second ISP block of the camera from at least one second ISP block parameter of the second ISP block based on at least one second tuning criterion.

Clause 81. The non-transitory computer-readable media of clause 80, wherein an image signal processor of the camera uses the plurality of tuned first ISP block parameters to process the image data and generates first processed image data.

Clause 82. The non-transitory computer-readable media of any of clauses 80-81, wherein the image signal processor of the camera uses the at least one second ISP block parameter of the at least one second ISP block to process the first processed image data, and generates second processed image data.

Clause 83. The non-transitory computer-readable media of any of clauses 80-82, wherein the second tuning criterion is based on at least one of a mounting location for the camera on an autonomous vehicle or objects to be detected from images generated by the camera.

Clause 84. The non-transitory computer-readable media of any of clauses 80-83, wherein the at least one of the plurality of first ISP blocks and the at least one second ISP block perform a same processing function using different values for ISP block parameters.

Clause 85. The non-transitory computer-readable media of any of clauses 80-84, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

Clause 86. The non-transitory computer-readable media of any of clauses 80-85, wherein the plurality of tuned second ISP blocks comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

Clause 87. The non-transitory computer-readable media of any of clauses 80-86, wherein generating the at least one tuned second ISP block parameter comprises adjusting the at least one second ISP block parameter until the at least one second ISP block of the camera outputs an image that satisfies an image quality threshold.

Clause 88. The non-transitory computer-readable media of any of clauses 80-87, wherein execution of the computer-executable instructions further cause the computing system to adjust at least one fourth ISP block parameter of a fourth ISP block of the camera based on the at least one second tuning criterion to generate at least one tuned fourth ISP block parameter for the fourth ISP block of the camera.

Clause 89. The non-transitory computer-readable media of any of clauses 80-88, wherein execution of the computer-executable instructions further cause the computing system to communicate the plurality of tuned first ISP block parameters and the at least one tuned second ISP block parameter to a third camera, wherein the third camera uses the plurality of tuned first ISP block parameters and the at least one tuned second ISP block parameter to process at least one third image data generated by a third image sensor of the third camera and generate images for a perception system of an autonomous vehicle.

Clause 90. The non-transitory computer-readable media of any of clauses 80-89, wherein a first image signal processor of the camera uses the plurality of tuned first ISP block parameters and the at least one tuned second ISP block parameter to process the image data and generate first images for a perception system of an autonomous vehicle, wherein a second image signal processor of the second camera uses the plurality of tuned first ISP block parameters and the at least one tuned second ISP block parameter to process second image data and generate second images for the perception system, and wherein the perception system detects objects in the first and second images, wherein the autonomous vehicle uses the detected objects to navigate.

Clause 91. A method, comprising: receiving image data from an image sensor of a first camera, generating first processed image data from the image data using a tuned first image signal processing (ISP) block parameter of a first ISP block, wherein the at least one tuned first ISP block parameter is tuned based on a first tuning criterion; generating second processed image data from the first processed image data using a tuned second image signal processing (ISP) block parameter of a second ISP block, wherein the at least one tuned second ISP block parameter is tuned based on a second tuning criterion that is different from the first tuning criterion; and generating an image based on the second processed image data.

Clause 92. The method of clause 91, wherein the second tuning criterion corresponds to at least one of a mounting location for the camera on an autonomous vehicle or objects to be detected from images generated by the first camera.

Clause 93. The method of any of clauses 91-92, wherein the first tuning criterion corresponds to at least one of a type of the image sensor or a type of the image signal processor.

Clause 94. The method of any of clauses 91-93, wherein the at least one tuned first ISP block parameter is tuned at a first time, and wherein the at least one tuned second ISP block parameter is tuned at a second time that is after the first time.

Clause 95. The method of any of clauses 91-94, wherein the first ISP block and second ISP block perform the same processing task on the image data.

Clause 96. The method of any of clauses 91-95, further comprising generating the first processed image data from the image data using a tuned third ISP block parameter of a third ISP block, wherein the at least one third ISP block parameter is tuned based on a first tuning criterion.

Clause 97. The method of any of clauses 91-96, wherein the first ISP block and the third ISP block perform different processing tasks on the image data.

Clause 98. The method of any of clauses 91-97, further comprising generating the second processed image data from the image data using a tuned fourth ISP block parameter of a fourth ISP block, wherein the at least one fourth ISP block parameter is tuned based on a second tuning criterion.

Clause 99. The method of any of clauses 91-98, wherein the second ISP block and the fourth ISP block perform different processing tasks on the image data.

Clause 100. The method of any of clauses 91-99, wherein the image is generated for a perception system of an autonomous vehicle, wherein the perception system detects objects in the image, and wherein the autonomous vehicle uses the detected objects to navigate.

Clause 101. A system, comprising: a data store storing computer-executable instructions; and a processor configured to: receive image data from an image sensor of a first camera, generate first processed image data from the image data using a tuned first image signal processing (ISP) block parameter of a first ISP block, wherein the at least one tuned first ISP block parameter is tuned based on a first tuning criterion; generate second processed image data from the first processed image data using a tuned second image signal processing (ISP) block parameter of a second ISP block, wherein the at least one tuned second ISP block parameter is tuned based on a second tuning criterion that is different from the first tuning criterion; and generate an image based on the second processed image data.

Clause 102. The system of clause 101, wherein the second tuning criterion corresponds to at least one of a mounting location for the camera on an autonomous vehicle or objects to be detected from images generated by the first camera.

Clause 103. The system of any of clauses 101-102, wherein the first tuning criterion corresponds to at least one of a type of the image sensor or a type of the image signal processor.

Clause 104. The system of any of clauses 101-103, wherein the at least one tuned first ISP block parameter is tuned at a first time, and wherein the at least one tuned second ISP block parameter is tuned at a second time that is after the first time.

Clause 105. The system of any of clauses 101-104, wherein the first ISP block and second ISP block perform the same processing task on the image data.

Clause 106. The system of any of clauses 101-105, wherein the processor is further configured to generate the first processed image data from the image data using a tuned third ISP block parameter of a third ISP block, wherein the at least one third ISP block parameter is tuned based on a first tuning criterion.

Clause 107. The system of any of clauses 101-106, wherein the first ISP block and the third ISP block perform different processing tasks on the image data.

Clause 108. The system of any of clauses 101-107, wherein the processor is further configured to generate the second processed image data from the image data using a tuned fourth ISP block parameter of a fourth ISP block, wherein the at least one fourth ISP block parameter is tuned based on a second tuning criterion.

Clause 109. The system of any of clauses 101-108, wherein the second ISP block and the fourth ISP block perform different processing tasks on the image data.

Clause 110. The system of any of clauses 101-109, wherein the image is generated for a perception system of an autonomous vehicle, wherein the perception system detects objects in the image, and wherein the autonomous vehicle uses the detected objects to navigate.

Clause 111. Non-transitory computer-readable media comprising computer-executable instructions that, when executed by a computing system, causes the computing system to: receive image data from an image sensor of a first camera, generate first processed image data from the image data using a tuned first image signal processing (ISP) block parameter of a first ISP block, wherein the at least one tuned first ISP block parameter is tuned based on a first tuning criterion; generate second processed image data from the first processed image data using a tuned second image signal processing (ISP) block parameter of a second ISP block, wherein the at least one tuned second ISP block parameter is tuned based on a second tuning criterion that is different from the first tuning criterion; and generate an image based on the second processed image data.

Clause 112. The non-transitory computer-readable media of clause 111, wherein the second tuning criterion corresponds to at least one of a mounting location for the camera on an autonomous vehicle or objects to be detected from images generated by the first camera.

Clause 113. The non-transitory computer-readable media of any of clauses 111-112, wherein the first tuning criterion corresponds to at least one of a type of the image sensor or a type of the image signal processor.

Clause 114. The non-transitory computer-readable media of any of clauses 111-113, wherein the at least one tuned first ISP block parameter is tuned at a first time, and wherein the at least one tuned second ISP block parameter is tuned at a second time that is after the first time.

Clause 115. The non-transitory computer-readable media of any of clauses 111-114, wherein the first ISP block and second ISP block perform the same processing task on the image data.

Clause 116. The non-transitory computer-readable media of any of clauses 111-115, wherein execution of the computer-executable instructions further cause the computing system to: generate the first processed image data from the image data using a tuned third ISP block parameter of a third ISP block, wherein the at least one third ISP block parameter is tuned based on a first tuning criterion.

Clause 117. The non-transitory computer-readable media of any of clauses 111-116, wherein the first ISP block and the third ISP block perform different processing tasks on the image data.

Clause 118. The non-transitory computer-readable media of any of clauses 111-117, wherein execution of the computer-executable instructions further cause the computing system to generate the second processed image data from the image data using a tuned fourth ISP block parameter of a fourth ISP block, wherein the at least one fourth ISP block parameter is tuned based on a second tuning criterion.

Clause 119. The non-transitory computer-readable media of any of clauses 111-118, wherein the second ISP block and the fourth ISP block perform different processing tasks on the image data.

Clause 120. The non-transitory computer-readable media of any of clauses 111-119, wherein the image is generated for a perception system of an autonomous vehicle, wherein the perception system detects objects in the image, and wherein the autonomous vehicle uses the detected objects to navigate.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   receiving first image data at a first time, wherein the first image data is associated with a first image sensor of a first camera;
   generating at least one tuned first image signal processing (ISP) block parameter for at least one first ISP block included in the first camera from at least one first ISP block parameter of the at least one first ISP block based on the first image data and at least one first tuning criterion of the first camera;
   receiving second image data at a second time, wherein the second image data is associated with the first image sensor;
   generating at least one tuned second ISP block parameter for at least one second ISP block included in the first camera from at least one second ISP block parameter of the at least one second ISP block based on the second image data and at least one second tuning criterion of the first camera; and
   communicating the at least one tuned first ISP block parameter and the at least one tuned second ISP block parameter to a second camera, wherein the second camera uses the at least one tuned first ISP block parameter and the at least one tuned second ISP block parameter to process at least one third image data generated by a second image sensor of the second camera and generate images for a perception system of an autonomous vehicle.

2. The method of claim 1, wherein a first image signal processor of the first camera uses the at least one tuned first ISP block parameter and the at least one tuned second ISP block parameter to process the first image data and the second image data, and generate first images for a perception system of an autonomous vehicle,
   wherein the perception system detects objects in the first images, and
   wherein the autonomous vehicle uses the detected objects to navigate.

3. The method of claim 1, further comprising communicating the at least one tuned first ISP block parameter and the at least one tuned second ISP block parameter to a third camera, wherein the third camera uses the at least one tuned first ISP block parameter and the at least one tuned second ISP block parameter to process at least one fourth image data generated by a third image sensor of the third camera and generate images for a perception system of an autonomous vehicle.

4. The method of claim 1, wherein the at least one second tuning criterion is based on at least one of a mounting location for the first camera on an autonomous vehicle or objects to be detected from images generated by the first camera.

5. The method of claim 1, wherein the at least one first ISP block comprises a plurality of first ISP blocks, wherein generating the at least one tuned first ISP block parameter comprises generating a plurality of tuned first ISP parameters for the plurality of first ISP blocks, and wherein a particular tuned first ISP block parameter of the plurality of tuned first ISP parameters is generated for a particular first ISP block of the plurality of first ISP blocks.

6. The method of claim 1, wherein the at least one second ISP block comprises a plurality of second ISP blocks, wherein generating the at least one tuned second ISP block parameter comprises generating a plurality of tuned second ISP parameters for the plurality of second ISP blocks, and wherein a particular tuned second ISP block parameter of the plurality of tuned second ISP parameters is generated for a particular second ISP block of the plurality of second ISP blocks.

7. The method of claim 1, wherein the at least one first tuning criterion includes at least one of a sharpness threshold, noise threshold, dynamic range threshold, tone reproduction threshold, contrast threshold, color accuracy threshold, distortion threshold, vignetting threshold, lateral chromatic aberration (LCA) threshold, lens flare threshold, color mode threshold, artifacts threshold, quality factor, or a modulation transfer function (MTF).

8. The method of claim 7, further comprising communicating the at least one tuned first ISP block parameter to a third camera, wherein at least one fourth ISP block parameter of a fourth ISP block of the third camera is adjusted based on at least one fourth tuning criterion associated with the third camera to form at least one tuned fourth ISP block parameter for the fourth ISP block of the third camera.

9. The method of claim 1, wherein the at least one first ISP block comprises at least one of a high dynamic range (HDR) merge, a bad pixel correction, an image black level correction, an image shading compensation, an achromatic aberration correction, an image white balance modification, an image demosaic, an image color correction, an image tone mapping, an image de-noising, an image sharpening, or an image motion compensation.

10. The method of claim 1, wherein generating the at least one tuned first ISP block parameter comprises adjusting the at least one first ISP block parameter until the at least one first ISP block of the first camera outputs an image that satisfies an image quality threshold.

11. The method of claim 1, further comprising adjusting at least one fourth ISP block parameter of a fourth ISP block of the first camera based on the at least one second tuning criterion to generate at least one tuned fourth ISP block parameter for the fourth ISP block of the first camera.

12. The method of claim 1, further comprising communicating the at least one tuned first ISP block parameter to a third camera, wherein at least one third ISP block parameter of at least one third ISP block included in the third camera is adjusted based on at least one third tuning criterion associated with the third camera to form at least one tuned third ISP block parameter for the at least one third ISP block included in the third camera.

13. The method of claim 12, wherein the at least one third ISP block comprises a plurality of third ISP blocks, wherein generating the at least one tuned third ISP block parameter comprises generating a plurality of tuned third ISP parameters for the plurality of third ISP blocks, and wherein a particular tuned third ISP block parameter of the plurality of tuned third ISP parameters is generated for a particular third ISP block of the plurality of third ISP blocks.

14. The method of claim 12, further comprising communicating the at least one tuned first ISP block parameter and the at least one tuned third ISP block parameter to a fourth camera, wherein the fourth camera uses the at least one tuned first ISP block parameter and the at least one tuned third ISP block parameter to process at least one fourth image data generated by the fourth camera and generate images for a perception system of an autonomous vehicle.

15. The method of claim 12, wherein the at least one third tuning criterion is at least one of a mounting location for the second camera on an autonomous vehicle or objects to be detected from images generated by the second camera.

16. The method of claim 12, wherein the at least one first tuning criterion is based on hardware of the first camera and the second camera.

17. The method of claim 1, wherein the first camera and the second camera include a same type of image signal processor and a same type of image sensor.

18. The method of claim 1,
wherein a first image signal processor of the first camera uses the at least one tuned first ISP block parameter and the at least one tuned second ISP block parameter to process the first image data and generate first images for a perception system of an autonomous vehicle,
wherein the perception system detects objects in the images generated by the second camera and the first images, wherein the autonomous vehicle uses the detected objects to navigate.

19. A system, comprising:
a data store storing computer-executable instructions; and
a processor configured to:
receive first image data at a first time, wherein the first image data is associated with a first image sensor of a first camera;
generate at least one tuned first image signal processing (ISP) block parameter for at least one first ISP block included in the first camera from at least one first ISP block parameter of the at least one first ISP block based on the first image data and at least one first tuning criterion of the first camera;
receive second image data at a second time, wherein the second image data is associated with the first image sensor;
generate at least one tuned second ISP block parameter for at least one second ISP block included in the first camera from at least one second ISP block parameter of the at least one second ISP block based on the second image data and at least one second tuning criterion of the first camera; and
communicating the at least one tuned first ISP block parameter and the at least one tuned second ISP block parameter to a second camera, wherein the second camera uses the at least one tuned first ISP block parameter and the at least one tuned second ISP block parameter to process at least one third image data generated by a second image sensor of the second camera and generate images for a perception system of an autonomous vehicle.

20. Non-transitory computer-readable media comprising computer-executable instructions that, when executed by a computing system, causes the computing system to:
receive first image data at a first time, wherein the first image data is associated with a first image sensor of a first camera;
generate at least one tuned first image signal processing (ISP) block parameter for at least one first ISP block included in the first camera from at least one first ISP block parameter of the at least one first ISP block based on the first image data and at least one first tuning criterion of the first camera;
receive second image data at a second time, wherein the second image data is associated with the first image sensor;
generate at least one tuned second ISP block parameter for at least one second ISP block included in the first camera from at least one second ISP block parameter of the at least one second ISP block based on the second image data and at least one second tuning criterion of the first camera; and
communicating the at least one tuned first ISP block parameter and the at least one tuned second ISP block parameter to a second camera, wherein the second camera uses the at least one tuned first ISP block parameter and the at least one tuned second ISP block parameter to process at least one third image data generated by a second image sensor of the second camera and generate images for a perception system of an autonomous vehicle.

* * * * *